US012124050B2

(12) United States Patent
Danziger et al.

(10) Patent No.: US 12,124,050 B2
(45) Date of Patent: Oct. 22, 2024

(54) COMPACT COLLIMATED IMAGE PROJECTOR

(71) Applicant: Lumus Ltd., Ness Ziona (IL)

(72) Inventors: Yochay Danziger, Kfar Vradim (IL); Elad Sharlin, Mishmar David (IL); Ronen Chriki, Lod (IL)

(73) Assignee: LUMUS LTD., Ness Ziona (IL)

( * ) Notice: Subject to any disclaimer, the term of this patent is extended or adjusted under 35 U.S.C. 154(b) by 614 days.

(21) Appl. No.: 17/424,235

(22) PCT Filed: Feb. 27, 2020

(86) PCT No.: PCT/IB2020/051679
§ 371 (c)(1),
(2) Date: Jul. 20, 2021

(87) PCT Pub. No.: WO2020/174433
PCT Pub. Date: Sep. 3, 2020

(65) Prior Publication Data
US 2022/0113549 A1    Apr. 14, 2022

Related U.S. Application Data

(60) Provisional application No. 62/811,583, filed on Feb. 28, 2019.

(51) Int. Cl.
*G02B 27/28* (2006.01)
*G02B 27/00* (2006.01)
(Continued)

(52) U.S. Cl.
CPC ....... *G02B 27/283* (2013.01); *G02B 27/0025* (2013.01); *G02B 27/281* (2013.01); *G02B 27/30* (2013.01); *G03B 21/2073* (2013.01)

(58) Field of Classification Search
CPC .............. G02B 27/283; G02B 27/0025; G02B 27/281; G02B 27/30; G03B 21/2073
(Continued)

(56) References Cited

U.S. PATENT DOCUMENTS 2,748,659 A    6/1956   Geffcken et al.
2,795,069 A    6/1957   George
(Continued)

FOREIGN PATENT DOCUMENTS

CN          1914544 A   *  2/2007   ........... G02B 27/283
CN       200941530 Y       9/2007
(Continued)

OTHER PUBLICATIONS

Salter, P. S. and Booth, M. J. et al. "Designing and aligning optical systems incorporating Liquid crystal spatial light modulators (SLMs)", Department of Engineering, University of Oxford, vr1.0, doi: 10.5281/zenodo.4518992 (published online Feb. 12, 2020) Salter, P. S. and Booth, M. J. Feb. 12, 2020 (Feb. 12, 2020).
(Continued)

*Primary Examiner* — Jerry L Brooks
(74) *Attorney, Agent, or Firm* — Rivka Friedman

(57) ABSTRACT

A collimated image projector that receives light from an illuminating source and propagates the light along a light path towards an exit pupil, the projector comprising: a first homogeneous dielectric polarizing beam splitter (PBS) deployed along the light path and defining a first transition from a first light path segment to a second light path segment; a second homogeneous dielectric PBS deployed parallel to the first PBS along the second light path segment and defining a second transition from the second light path segment to a third light path segment; and collimating optics deployed along the light path after the second PBS so as to direct a collimated image towards the exit pupil; wherein the
(Continued)

first and second PBSs are deployed such that either the first and second transitions are both performed via transmission, or the first and second transitions are both performed via reflection.

15 Claims, 14 Drawing Sheets

(51) Int. Cl.
    *G02B 27/30* (2006.01)
    *G03B 21/20* (2006.01)

(58) Field of Classification Search
    USPC .......................................................... 353/20
    See application file for complete search history.

(56) References Cited

U.S. PATENT DOCUMENTS

| | | |
|---|---|---|
| 2,886,911 A | 5/1959 | George |
| 3,491,245 A | 1/1970 | George |
| 3,626,394 A | 12/1971 | Nelson et al. |
| 3,667,621 A | 6/1972 | Barlow |
| 3,677,621 A | 7/1972 | Smith |
| 3,737,212 A | 6/1973 | Antonson et al. |
| 3,802,763 A | 4/1974 | Cook et al. |
| 3,829,197 A | 8/1974 | Thelen |
| 3,857,109 A | 12/1974 | Pilloff |
| 3,873,209 A | 3/1975 | Schinke et al. |
| 3,940,204 A | 2/1976 | Withrington |
| 3,969,023 A | 7/1976 | Brandt et al. |
| 4,084,883 A | 4/1978 | Eastman et al. |
| 4,191,446 A | 3/1980 | Arditty et al. |
| 4,309,070 A | 1/1982 | St. Leger Searle |
| 4,331,387 A | 5/1982 | Wentz |
| 4,355,864 A | 10/1982 | Soref |
| 4,516,828 A | 5/1985 | Steele |
| 4,613,216 A | 9/1986 | Herbec et al. |
| 4,662,717 A | 5/1987 | Yamada et al. |
| 4,711,512 A | 12/1987 | Upatnieks |
| 4,715,684 A | 12/1987 | Gagnon |
| 4,720,189 A | 1/1988 | Heynen et al. |
| 4,775,217 A | 10/1988 | Ellis |
| 4,798,448 A | 1/1989 | Van Raalte |
| 4,805,988 A | 2/1989 | Dones |
| 4,932,743 A | 6/1990 | Isobe et al. |
| 4,978,952 A | 12/1990 | Irwin |
| 5,033,828 A | 7/1991 | Haruta |
| 5,076,664 A | 12/1991 | Migozzi |
| 5,096,520 A | 3/1992 | Faris |
| 5,157,526 A | 10/1992 | Kondo et al. |
| 5,208,800 A | 5/1993 | Isobe et al. |
| 5,231,642 A | 7/1993 | Scifres et al. |
| 5,235,589 A | 8/1993 | Yokomori et al. |
| 5,301,067 A | 4/1994 | Bleier et al. |
| 5,353,134 A | 10/1994 | Michel et al. |
| 5,367,399 A | 11/1994 | Kramer |
| 5,369,415 A | 11/1994 | Richard et al. |
| 5,453,877 A | 9/1995 | Gerbe et al. |
| 5,543,877 A | 8/1996 | Takashi et al. |
| 5,555,329 A | 9/1996 | Kuper et al. |
| 5,619,601 A | 4/1997 | Akashi et al. |
| 5,650,873 A | 7/1997 | Gal et al. |
| 5,680,209 A | 10/1997 | Meinrad |
| 5,712,694 A | 1/1998 | Taira et al. |
| 5,724,163 A | 3/1998 | Yair |
| 5,745,199 A | 4/1998 | Suzuki et al. |
| 5,751,480 A | 5/1998 | Kitagishi |
| 5,764,412 A | 6/1998 | Suzuki et al. |
| 5,829,854 A | 11/1998 | Jones |
| 5,883,684 A | 3/1999 | Millikan et al. |
| 5,896,232 A | 4/1999 | Budd et al. |
| 5,919,601 A | 7/1999 | Nguyen et al. |
| 5,966,223 A | 10/1999 | Yaakov et al. |
| 5,982,536 A | 11/1999 | Swan |
| 6,021,239 A | 2/2000 | Minami et al. |
| 6,052,500 A | 4/2000 | Takano et al. |
| 6,091,548 A | 7/2000 | Chen |
| 6,137,461 A | 10/2000 | Deter et al. |
| 6,144,347 A | 11/2000 | Mizoguchi et al. |
| 6,185,015 B1 | 2/2001 | Silviu et al. |
| 6,222,676 B1 | 4/2001 | Togino et al. |
| 6,231,992 B1 | 5/2001 | Niebauer et al. |
| 6,239,092 B1 | 5/2001 | Papasso et al. |
| 6,264,328 B1 | 7/2001 | Williams |
| 6,322,256 B1 | 11/2001 | Inada et al. |
| 6,324,330 B1 | 11/2001 | Stites |
| 6,349,001 B1 | 2/2002 | Spitzer |
| 6,362,861 B1 | 3/2002 | Hertz et al. |
| 6,384,982 B1 | 5/2002 | Spitzer |
| 6,388,814 B2 | 5/2002 | Tanaka |
| 6,404,550 B1 | 6/2002 | Yajima |
| 6,404,947 B1 | 6/2002 | Matsuda |
| 6,483,113 B1 | 11/2002 | Sealy et al. |
| 6,490,104 B1 | 12/2002 | Gleckman et al. |
| 6,509,982 B2 | 1/2003 | Steiner |
| 6,542,307 B2 | 4/2003 | Gleckman |
| 6,556,282 B2 | 4/2003 | Jamieson et al. |
| 6,577,411 B1 | 6/2003 | David |
| 6,671,100 B1 | 12/2003 | McRuer |
| 6,690,513 B2 | 2/2004 | Hulse et al. |
| 6,710,902 B2 | 3/2004 | Takeyama |
| 6,775,432 B2 | 8/2004 | Basu |
| 6,791,760 B2 | 9/2004 | Janeczko et al. |
| 6,798,579 B2 | 9/2004 | Robinson et al. |
| 6,829,095 B2 | 12/2004 | Amitai |
| 6,847,488 B2 | 1/2005 | Travis |
| 6,880,931 B2 | 4/2005 | Moliton et al. |
| 6,927,694 B1 | 9/2005 | Smith et al. |
| 6,942,925 B1 | 9/2005 | Lazarev et al. |
| 7,016,113 B2 | 3/2006 | Choi et al. |
| 7,021,777 B2 | 4/2006 | Amitai |
| 7,088,664 B2 | 8/2006 | Kim et al. |
| 7,175,304 B2 | 2/2007 | Wadia et al. |
| 7,205,960 B2 | 4/2007 | David |
| 7,355,795 B1 | 4/2008 | Yamazaki et al. |
| 7,384,159 B2 | 6/2008 | Takeda |
| 7,391,573 B2 | 6/2008 | Amitai |
| 7,418,170 B2 | 8/2008 | Mukawa et al. |
| 7,430,355 B2 | 9/2008 | Heikenfeld et al. |
| 7,448,170 B2 | 11/2008 | Milovan et al. |
| 7,457,040 B2 | 11/2008 | Amitai |
| 7,577,326 B2 | 8/2009 | Amitai |
| 7,612,879 B2 | 11/2009 | Stumpe et al. |
| 7,643,214 B2 | 1/2010 | Amitai |
| 7,672,055 B2 | 3/2010 | Amitai |
| 7,724,443 B2 | 5/2010 | Amitai |
| 7,778,508 B2 | 8/2010 | Hirayama |
| 7,808,625 B2 | 10/2010 | Nakamura et al. |
| 7,949,214 B2 | 5/2011 | Dejong |
| 7,995,275 B2 | 8/2011 | Maeda et al. |
| 8,000,020 B2 | 8/2011 | Amitai |
| 8,035,872 B2 | 10/2011 | Ouchi |
| 8,098,439 B2 | 1/2012 | Amitai et al. |
| 8,187,481 B1 | 5/2012 | Hobbs |
| 8,369,019 B2 | 2/2013 | Baker |
| 8,405,573 B2 | 3/2013 | Lapidot et al. |
| 8,432,614 B2 | 4/2013 | Amitai |
| 8,472,119 B1 | 6/2013 | Kelly |
| 8,479,119 B2 | 7/2013 | Hörentrup et al. |
| 8,643,948 B2 | 2/2014 | Amitai et al. |
| 8,655,178 B2 | 2/2014 | Capron et al. |
| 8,665,178 B1 | 3/2014 | Wang |
| 8,666,208 B1 | 3/2014 | Amirparviz et al. |
| 8,718,437 B2 | 5/2014 | Sullivan et al. |
| 8,736,963 B2 | 5/2014 | Robbins et al. |
| 8,743,464 B1 | 6/2014 | Amirparviz |
| 8,913,865 B1 | 12/2014 | Bennett |
| 8,965,152 B2 | 2/2015 | Simmonds |
| 9,025,253 B2 | 5/2015 | Hadad et al. |
| 9,523,852 B1 | 12/2016 | Brown et al. |
| 9,541,762 B2 | 1/2017 | Mukawa et al. |
| 9,551,880 B2 | 1/2017 | Amitai |
| 9,709,809 B2 | 7/2017 | Miyawaki et al. |

(56) References Cited

U.S. PATENT DOCUMENTS

| | | |
|---|---|---|
| 9,798,061 B2 | 10/2017 | Hsiao et al. |
| 9,805,633 B2 | 10/2017 | Zheng |
| 9,933,684 B2 | 4/2018 | Brown et al. |
| 10,222,535 B2 | 3/2019 | Remhof et al. |
| 10,302,957 B2 | 5/2019 | Sissom |
| 10,466,479 B2 | 11/2019 | Shih et al. |
| 10,908,426 B2 | 2/2021 | Amitai |
| 10,951,867 B2 | 3/2021 | Pappas et al. |
| 2001/0000124 A1 | 4/2001 | Joel et al. |
| 2001/0030860 A1 | 10/2001 | Kimura et al. |
| 2002/0015233 A1 | 2/2002 | Park |
| 2002/0097762 A1 | 7/2002 | Yoshimura et al. |
| 2002/0176173 A1 | 11/2002 | Song |
| 2002/0191297 A1 | 12/2002 | Gleckman et al. |
| 2003/0007157 A1 | 1/2003 | Hulse et al. |
| 2003/0020006 A1 | 1/2003 | Janeczko et al. |
| 2003/0063042 A1 | 4/2003 | Friesem et al. |
| 2003/0072160 A1 | 4/2003 | Kuepper et al. |
| 2003/0090439 A1 | 5/2003 | Spitzer et al. |
| 2003/0165017 A1 | 9/2003 | Amitai |
| 2003/0169504 A1 | 9/2003 | Kaminsky et al. |
| 2003/0197938 A1 | 10/2003 | Schmidt et al. |
| 2003/0218718 A1 | 11/2003 | Moliton et al. |
| 2003/0235768 A1 | 12/2003 | Fincher et al. |
| 2004/0032660 A1 | 2/2004 | Amital |
| 2004/0033528 A1 | 2/2004 | Amitai |
| 2004/0085649 A1 | 5/2004 | Repetto et al. |
| 2004/0013068 A1 | 7/2004 | Aastuen et al. |
| 2004/0130681 A1* | 7/2004 | Aastuen ............... G02B 27/126 348/E9.027 |
| 2004/0137189 A1 | 7/2004 | Tellini et al. |
| 2004/0233534 A1 | 11/2004 | Nakanishi et al. |
| 2005/0012842 A1 | 1/2005 | Miyagawa et al. |
| 2005/0018308 A1 | 1/2005 | Cassarly et al. |
| 2005/0024849 A1 | 2/2005 | Parker et al. |
| 2005/0078388 A1 | 4/2005 | Amitai |
| 2005/0083592 A1 | 4/2005 | Amital |
| 2005/0084210 A1 | 4/2005 | Cha |
| 2005/0168697 A1* | 8/2005 | Bruzzone ............... G02B 5/305 353/20 |
| 2005/0174641 A1 | 8/2005 | Greenberg |
| 2005/0174658 A1 | 8/2005 | Long et al. |
| 2005/0180687 A1 | 8/2005 | Amitai |
| 2005/0265044 A1 | 12/2005 | Chen et al. |
| 2006/0126182 A1 | 6/2006 | Levola |
| 2006/0171046 A1 | 8/2006 | Recco et al. |
| 2006/0268421 A1 | 11/2006 | Shimizu et al. |
| 2007/0000219 A1 | 1/2007 | Hashezumi et al. |
| 2007/0002191 A1 | 1/2007 | Hashizume et al. |
| 2007/0035707 A1 | 2/2007 | Margulis |
| 2007/0070859 A1 | 3/2007 | Hirayama |
| 2007/0091445 A1 | 4/2007 | Amitai |
| 2007/0097513 A1 | 5/2007 | Amital |
| 2007/0155277 A1 | 7/2007 | Amitai |
| 2007/0159673 A1 | 7/2007 | Freeman et al. |
| 2007/0165192 A1 | 7/2007 | Prior |
| 2007/0188837 A1 | 8/2007 | Shimizu et al. |
| 2008/0025667 A1 | 1/2008 | Amitai |
| 2008/0009458 A1 | 4/2008 | Hirayama |
| 2008/0094586 A1 | 4/2008 | Hirayama |
| 2008/0106775 A1 | 5/2008 | Amitai |
| 2008/0151375 A1 | 6/2008 | Lin |
| 2008/0151379 A1 | 6/2008 | Amitai |
| 2008/0186604 A1 | 8/2008 | Amitai |
| 2008/0192239 A1 | 8/2008 | Shin-Etsu |
| 2008/0198471 A1 | 8/2008 | Amitai |
| 2008/0247150 A1 | 9/2008 | Itoh et al. |
| 2008/0259429 A1 | 10/2008 | Kamm et al. |
| 2008/0278812 A1 | 11/2008 | Amitai |
| 2008/0285140 A1 | 11/2008 | Amitai |
| 2009/0010023 A1 | 1/2009 | Kanade et al. |
| 2009/0052046 A1 | 2/2009 | Amitai |
| 2009/0052047 A1 | 2/2009 | Amitai |
| 2009/0097127 A1 | 4/2009 | Amitai |
| 2009/0122414 A1 | 5/2009 | Amitai |
| 2009/0153437 A1 | 6/2009 | Aharoni |
| 2009/0190222 A1 | 7/2009 | Simmonds et al. |
| 2010/0027289 A1 | 2/2010 | Aiki et al. |
| 2010/0053148 A1 | 3/2010 | Khazeni et al. |
| 2010/0067110 A1 | 3/2010 | Yaakov et al. |
| 2010/0111472 A1 | 5/2010 | DeJong |
| 2010/0171680 A1 | 7/2010 | Lapidot et al. |
| 2010/0201128 A1 | 8/2010 | Robert |
| 2010/0202048 A1 | 8/2010 | Amitai et al. |
| 2010/0202128 A1 | 8/2010 | Saccomanno |
| 2010/0214635 A1 | 8/2010 | Sasaki et al. |
| 2010/0278480 A1 | 11/2010 | Vasylyev et al. |
| 2010/0291489 A1 | 11/2010 | Moskovits et al. |
| 2011/0002019 A1 | 1/2011 | Routley et al. |
| 2011/0096566 A1 | 4/2011 | Tsai et al. |
| 2011/0176218 A1 | 7/2011 | Noui |
| 2011/0227661 A1 | 9/2011 | Numata et al. |
| 2011/0242661 A1 | 10/2011 | Simmonds |
| 2012/0039576 A1 | 2/2012 | Dangel et al. |
| 2012/0062850 A1 | 3/2012 | Travis |
| 2012/0062998 A1 | 3/2012 | Schultz et al. |
| 2012/0147361 A1 | 6/2012 | Mochizuki et al. |
| 2012/0154920 A1 | 6/2012 | Ga et al. |
| 2012/0176682 A1 | 7/2012 | DeJong |
| 2012/0179369 A1 | 7/2012 | Lapidot et al. |
| 2012/0194781 A1 | 8/2012 | Agurok |
| 2012/0200938 A1 | 8/2012 | Totani et al. |
| 2012/0274751 A1 | 11/2012 | Smith et al. |
| 2012/0306940 A1 | 12/2012 | Machida |
| 2013/0016292 A1 | 1/2013 | Mlao et al. |
| 2013/0022316 A1 | 1/2013 | Pelletier et al. |
| 2013/0027655 A1 | 1/2013 | Blum et al. |
| 2013/0135749 A1 | 5/2013 | Akutsu et al. |
| 2013/0229717 A1 | 9/2013 | Amitai |
| 2013/0250430 A1 | 9/2013 | Robbuns et al. |
| 2013/0276960 A1 | 10/2013 | Amitai |
| 2013/0279017 A1 | 10/2013 | Levi et al. |
| 2013/0321432 A1 | 12/2013 | Burns et al. |
| 2013/0334504 A1 | 12/2013 | Thompson et al. |
| 2014/0003762 A1 | 1/2014 | Macnamara |
| 2014/0043688 A1 | 2/2014 | Schrader et al. |
| 2014/0118813 A1 | 5/2014 | Amitai et al. |
| 2014/0118836 A1 | 5/2014 | Amitai et al. |
| 2014/0118837 A1 | 5/2014 | Amitai et al. |
| 2014/0126051 A1 | 5/2014 | Amitai et al. |
| 2014/0126052 A1 | 5/2014 | Amitai et al. |
| 2014/0126056 A1 | 5/2014 | Amitai et al. |
| 2014/0126057 A1 | 5/2014 | Amitai et al. |
| 2014/0126175 A1 | 5/2014 | Amitai et al. |
| 2014/0160577 A1 | 6/2014 | Dominici et al. |
| 2014/0185142 A1 | 7/2014 | Gupta et al. |
| 2014/0226215 A1 | 8/2014 | Komatsu et al. |
| 2014/0226361 A1 | 8/2014 | Vasylyev |
| 2014/0232619 A1 | 8/2014 | Hiraide |
| 2014/0240834 A1 | 8/2014 | Mason |
| 2014/0334777 A1 | 11/2014 | Dubroca et al. |
| 2015/0016777 A1 | 1/2015 | Abovitz et al. |
| 2015/0081313 A1 | 3/2015 | Boross et al. |
| 2015/0131059 A1 | 5/2015 | Fischer et al. |
| 2015/0138451 A1 | 5/2015 | Amitai |
| 2015/0138646 A1 | 5/2015 | Tatsugi |
| 2015/0153569 A1 | 6/2015 | Yonekubo |
| 2015/0160529 A1 | 6/2015 | Popovich et al. |
| 2015/0182348 A1 | 7/2015 | Siegal et al. |
| 2015/0198805 A1 | 7/2015 | Mansharof et al. |
| 2015/0205140 A1 | 7/2015 | Mansharof et al. |
| 2015/0205141 A1 | 7/2015 | Mansharof et al. |
| 2015/0219834 A1 | 8/2015 | Nichol et al. |
| 2015/0241619 A1 | 8/2015 | Richards et al. |
| 2015/0277127 A1 | 10/2015 | Amitai |
| 2015/0293360 A1 | 10/2015 | Amitai |
| 2015/0309312 A1 | 10/2015 | Ackerman |
| 2015/0331546 A1 | 11/2015 | Craven-Bartle et al. |
| 2016/0062119 A1 | 3/2016 | Fitch et al. |
| 2016/0116743 A1 | 4/2016 | Amitai |
| 2016/0170212 A1 | 6/2016 | Amitai |
| 2016/0170213 A1 | 6/2016 | Amitai |
| 2016/0170214 A1 | 6/2016 | Amitai |
| 2016/0187656 A1 | 6/2016 | Amitai |

(56) References Cited

U.S. PATENT DOCUMENTS

| | | |
|---|---|---|
| 2016/0202048 A1 | 7/2016 | Meng |
| 2016/0234485 A1 | 8/2016 | Robbins et al. |
| 2016/0238844 A1 | 8/2016 | Dobschal |
| 2016/0267309 A1 | 9/2016 | High |
| 2016/0313567 A1 | 10/2016 | Kurashige |
| 2016/0314564 A1 | 10/2016 | Jones |
| 2016/0341964 A1 | 11/2016 | Amitai |
| 2016/0349518 A1 | 12/2016 | Amitai et al. |
| 2016/0363679 A1 | 12/2016 | Jurok et al. |
| 2016/0370589 A1 | 12/2016 | Wang |
| 2016/0370693 A1 | 12/2016 | Watanabe |
| 2017/0003504 A1 | 1/2017 | Vallius et al. |
| 2017/0004574 A1 | 1/2017 | Deats et al. |
| 2017/0045743 A1 | 2/2017 | Dobschal et al. |
| 2017/0045744 A1 | 2/2017 | Amitai |
| 2017/0052376 A1 | 2/2017 | Amitai |
| 2017/0052377 A1 | 2/2017 | Amitai |
| 2017/0075119 A1 | 3/2017 | Schultz et al. |
| 2017/0097506 A1 | 4/2017 | Schowengerdt et al. |
| 2017/0122725 A1 | 5/2017 | Yeoh |
| 2017/0242249 A1 | 8/2017 | Wall |
| 2017/0255012 A1 | 9/2017 | Tam |
| 2017/0276947 A1 | 9/2017 | Yokoyama |
| 2017/0336636 A1 | 11/2017 | Amitai et al. |
| 2017/0343822 A1 | 11/2017 | Border et al. |
| 2017/0357095 A1 | 12/2017 | Amitai |
| 2017/0357100 A1 | 12/2017 | Ouderkirk et al. |
| 2017/0363799 A1 | 12/2017 | Ofir et al. |
| 2018/0021020 A1 | 1/2018 | Lefevre et al. |
| 2018/0039082 A1 | 2/2018 | Amitai |
| 2018/0067315 A1 | 3/2018 | Amitai et al. |
| 2018/0157057 A1 | 6/2018 | Gelberg et al. |
| 2018/0210202 A1 | 7/2018 | Danziger |
| 2018/0267295 A1 | 9/2018 | Dalrymple et al. |
| 2018/0267317 A1 | 9/2018 | Amitai |
| 2018/0275384 A1 | 9/2018 | Danziger et al. |
| 2018/0284440 A1 | 10/2018 | Popovich et al. |
| 2018/0292592 A1 | 10/2018 | Danziger |
| 2018/0292599 A1 | 10/2018 | Ofir et al. |
| 2018/0322845 A1 | 11/2018 | Machida |
| 2018/0373039 A1 | 12/2018 | Amitai |
| 2019/0011710 A1 | 1/2019 | Amitai |
| 2019/0020858 A1 | 1/2019 | Pappas et al. |
| 2019/0022731 A1 | 1/2019 | Yabuoshi |
| 2019/0056600 A1 | 2/2019 | Danziger et al. |
| 2019/0064518 A1 | 2/2019 | Danziger |
| 2019/0137818 A1 | 5/2019 | Saito |
| 2019/0155035 A1 | 5/2019 | Amitai |
| 2019/0170327 A1 | 6/2019 | Eisenfeld et al. |
| 2019/0187482 A1 | 6/2019 | Lanman |
| 2019/0208187 A1 | 7/2019 | Danziger |
| 2019/0212487 A1 | 7/2019 | Danziger et al. |
| 2019/0227215 A1 | 7/2019 | Danziger et al. |
| 2019/0227317 A1 | 7/2019 | Trail et al. |
| 2019/0278086 A1 | 9/2019 | Ofir |
| 2019/0285900 A1 | 9/2019 | Amitai |
| 2019/0293856 A1 | 9/2019 | Danziger |
| 2019/0339530 A1 | 11/2019 | Amitai |
| 2019/0346609 A1 | 11/2019 | Eisenfeld |
| 2019/0361240 A1 | 11/2019 | Gelberg |
| 2019/0361241 A1 | 11/2019 | Amitai |
| 2019/0377187 A1 | 12/2019 | Rubin et al. |
| 2019/0391408 A1 | 12/2019 | Mansharof |
| 2020/0033572 A1 | 1/2020 | Danziger et al. |
| 2020/0041713 A1 | 2/2020 | Danziger |
| 2020/0089001 A1 | 3/2020 | Amitai et al. |
| 2020/0110211 A1 | 4/2020 | Danziger et al. |
| 2020/0120329 A1 | 4/2020 | Danziger |
| 2020/0133008 A1 | 4/2020 | Amitai |
| 2020/0150330 A1 | 5/2020 | Danziger et al. |
| 2020/0183159 A1 | 6/2020 | Danziger |
| 2020/0183170 A1 | 6/2020 | Amitai et al. |
| 2020/0200963 A1 | 6/2020 | Eisenfeld et al. |
| 2020/0209667 A1 | 7/2020 | Sharlin et al. |
| 2020/0225484 A1 | 7/2020 | Takagi et al. |
| 2020/0241308 A1 | 7/2020 | Danziger et al. |
| 2020/0249481 A1 | 8/2020 | Danziger et al. |
| 2020/0278557 A1 | 9/2020 | Greenstein et al. |
| 2020/0278558 A1 | 9/2020 | Yamamoto et al. |
| 2020/0285060 A1 | 9/2020 | Amitai |
| 2020/0292417 A1 | 9/2020 | Lobachinsky et al. |
| 2020/0292744 A1 | 9/2020 | Danziger et al. |
| 2020/0292819 A1 | 9/2020 | Danziger et al. |
| 2020/0310024 A1 | 10/2020 | Danziger et al. |
| 2020/0326545 A1 | 10/2020 | Amitai et al. |
| 2020/0371311 A1 | 11/2020 | Lobachinsky et al. |
| 2021/0003849 A1 | 1/2021 | Amitai et al. |
| 2021/0018755 A1 | 1/2021 | Amitai |
| 2021/0033773 A1 | 2/2021 | Danziger et al. |
| 2021/0033862 A1 | 2/2021 | Danziger et al. |
| 2021/0033872 A1 | 2/2021 | Rubin et al. |
| 2021/0055218 A1 | 2/2021 | Aldaag et al. |
| 2021/0055466 A1 | 2/2021 | Eisenfeld |
| 2021/0055561 A1 | 2/2021 | Danziger et al. |
| 2021/0063733 A1 | 3/2021 | Ronen |
| 2021/0072553 A1 * | 3/2021 | Danziger ............. G02B 5/0215 |
| 2021/0099691 A1 | 4/2021 | Danziger |
| 2021/0109351 A1 | 4/2021 | Danzinger et al. |
| 2021/0116367 A1 | 4/2021 | Gelberg et al. |
| 2021/0141141 A1 | 5/2021 | Danziger et al. |
| 2021/0149199 A1 | 5/2021 | Guan |
| 2021/0149204 A1 | 5/2021 | Amitai |
| 2021/0157150 A1 | 5/2021 | Amitai |
| 2021/0165231 A1 | 6/2021 | Gelberg et al. |
| 2021/0239898 A1 | 8/2021 | Danziger et al. |
| 2021/0271006 A1 | 9/2021 | Ronen et al. |
| 2022/0003914 A1 | 1/2022 | Danziger et al. |
| 2022/0004001 A1 | 1/2022 | Danziger et al. |
| 2022/0004014 A1 | 1/2022 | Ronen et al. |
| 2022/0019018 A1 | 1/2022 | Gilo et al. |
| 2022/0030205 A1 | 1/2022 | Danziger |
| 2022/0043272 A1 | 2/2022 | Amitai |
| 2022/0057643 A1 | 2/2022 | Eisenfeld et al. |
| 2022/0075194 A1 | 3/2022 | Ronen |
| 2022/0091413 A1 | 3/2022 | Grabarnik et al. |
| 2022/0099885 A1 | 3/2022 | Ronen et al. |
| 2022/0100032 A1 | 3/2022 | Ronen |
| 2022/0128816 A1 | 4/2022 | Danziger et al. |
| 2022/0234277 A1 * | 7/2022 | Song ................ G02F 1/136209 |
| 2022/0043269 A1 | 10/2022 | Maziel |

FOREIGN PATENT DOCUMENTS

| | | | | |
|---|---|---|---|---|
| CN | 100405096 C | * | 7/2008 | ............. G02B 27/10 |
| CN | 101542346 | | 9/2009 | |
| CN | 101542356 A | * | 9/2009 | ......... G02B 27/0081 |
| CN | 101846799 A | | 9/2010 | |
| CN | 103837988 | | 6/2014 | |
| CN | 106104569 | | 11/2016 | |
| CN | 106154569 A | * | 11/2016 | ........... G02B 27/283 |
| CN | 107238928 | | 10/2017 | |
| CN | 106154569 | | 2/2019 | |
| DE | 1422172 | | 11/1970 | |
| DE | 19725262 | | 12/1998 | |
| DE | 102013106392 | | 12/2014 | |
| EP | 0365406 | | 4/1990 | |
| EP | 0380035 | | 8/1990 | |
| EP | 0399865 | | 11/1990 | |
| EP | 0543718 | | 5/1993 | |
| EP | 0566004 | | 10/1993 | |
| EP | 1158336 | | 11/2001 | |
| EP | 1180711 | | 2/2002 | |
| EP | 1326102 | | 7/2003 | |
| EP | 1385023 | | 1/2004 | |
| EP | 1485747 | | 12/2004 | |
| EP | 1562066 | | 8/2005 | |
| EP | 0770818 | | 4/2007 | |
| EP | 1779159 | | 5/2007 | |
| EP | 2530510 | | 12/2012 | |
| FR | 2496905 | | 6/1982 | |
| FR | 2638242 | | 4/1990 | |
| FR | 2721872 | | 1/1996 | |
| GB | 1514977 | | 6/1978 | |
| GB | 2220081 | | 12/1989 | |

(56) References Cited

FOREIGN PATENT DOCUMENTS

| | | |
|---|---|---|
| GB | 2272980 | 6/1994 |
| GB | 2278222 | 11/1994 |
| GB | 2278888 | 12/1994 |
| JP | H04159503 | 6/1992 |
| JP | H08-070782 | 3/1996 |
| JP | H09304036 A | 11/1997 |
| JP | 2001021448 A | 7/1999 |
| JP | 2001021448 | 1/2001 |
| JP | 2001343608 | 12/2001 |
| JP | 2002539498 | 11/2002 |
| JP | 2003065739 | 3/2003 |
| JP | 2003140081 | 5/2003 |
| JP | 2003149643 | 5/2003 |
| JP | 2012163659 | 5/2003 |
| JP | 2003536102 | 12/2003 |
| JP | 2004145330 | 5/2004 |
| JP | 2004527801 | 9/2004 |
| JP | 2005084522 | 3/2005 |
| JP | 2006003872 | 1/2006 |
| JP | 2006145644 | 6/2006 |
| JP | 2006145644 A * | 6/2006 |
| JP | 2006201637 | 8/2006 |
| JP | 2008158446 | 12/2006 |
| JP | 2008053517 | 3/2008 |
| JP | 2010014705 | 1/2010 |
| JP | 2010044172 | 2/2010 |
| JP | 2011221235 | 11/2011 |
| JP | 2012058404 | 3/2012 |
| JP | 2012123936 | 6/2012 |
| JP | 2012198263 | 10/2012 |
| JP | 2016028275 | 2/2016 |
| JP | 2016033867 | 3/2016 |
| JP | 2018189906 | 11/2018 |
| KR | 20190032382 A * | 3/2019 |
| TW | 201809798 | 3/2018 |
| WO | 9510106 | 4/1995 |
| WO | 9815868 | 4/1998 |
| WO | 1998/058291 | 12/1998 |
| WO | 9952002 | 10/1999 |
| WO | 0004407 | 1/2000 |
| WO | 0063738 | 10/2000 |
| WO | 0127685 | 4/2001 |
| WO | 0195025 | 12/2001 |
| WO | 02082168 | 10/2002 |
| WO | 03058320 | 7/2003 |
| WO | 2004109349 | 12/2004 |
| WO | 2005024485 | 3/2005 |
| WO | 2005024491 | 3/2005 |
| WO | 2005093493 | 10/2005 |
| WO | 2006098097 | 9/2006 |
| WO | 2009009268 | 1/2009 |
| WO | 2009074638 | 6/2009 |
| WO | 2011130720 | 10/2011 |
| WO | 2013065656 | 5/2013 |
| WO | 2013188464 | 12/2013 |
| WO | 2015081313 | 6/2015 |
| WO | 2015158828 | 10/2015 |
| WO | 2016103251 | 6/2016 |
| WO | 2016132347 | 8/2016 |
| WO | 2017106873 | 6/2017 |
| WO | 2017199232 | 11/2017 |
| WO | 2018/013307 | 1/2018 |
| WO | 2021260708 | 2/2022 |

OTHER PUBLICATIONS

Jinying Li et al "Improvement of pointing accuracy for Risley prisms by parameter identification", Sep. 2017Applied Optics 56(26):7358; DOI:10.1364/AO.56.007358.

Klaus Ehrmann et al "Optical power mapping using paraxial laser scanning", Proceedings vol. 7163, Ophthalmic Technologies XIX; 71631E (2009) https://doi.org/10.1117/12.806765 Event: SPIE BIOS, 2009, San Jose, California, United States.

Erhui Qi et al "The Application of Pentaprism Scanning Technology on the Manufacturing of M3MP", Proc. of SPIE vol. 9682 96821A-1 Downloaded From: http://proceedings.spiedigitallibrary.org/ on Dec. 8, 2016 Terms of Use: http://spiedigitallibrary.org/ss/termsofuse.aspx.

Wei Chen et al"An Image Quality Evaluation Method of near-eye display", First published: May 25, 2016 https://doi.org/10.1002/sdtp.10935.

Amotchkina T. et al.; "Stress compensation with antireflection coatings for ultrafast laser applications: from theory to practice," Opt. Express 22, 30387-30393 (2014) Amotchkina T et al. Dec. 31, 2014 (Dec. 31, 2014).

Mori H. et al., "Reflective coatings for the future x-ray mirror substrates", Proc. SPIE 10699, Space Telescopes and Instrumentation 2018: Ultraviolet to Gamma Ray, 1069941 (Jul. 6, 2018); available at URL <http://doi.org/10.1117/12.2313469> Mori H. et al. Jul. 6, 2018 (Jul. 6, 2018).

Chalifoux B.D. et al., "Compensating film stress in thin silicon substrates using ion implantation," Opt. Express 27, 11182-11195 (Jan. 21, 2019) Chalifoux B.D et al. Jan. 21, 2019 (Jan. 21, 2019).

Petros I. Stavroulakis, Stuart A. Boden, Thomas Johnson, and Darren M. Bagnall, "Suppression of backscattered diffraction from sub-wavelength 'moth-eye' arrays," Opt. Express 21, 1-11 (2013).

R. J. Weiblen, C. R. Menyuk, L. E. Busse, L. B. Shaw, J. S. Sanghera, and I. D. Aggarwal, "Optimized moth-eye anti- reflective structures for As2S3 chalcogenide optical fibers," Opt. Express 24, 10172-10187 (2016).

Qiaoyin Yang et al. "Antireflection effects at nanostructured material interfaces and the suppression of thin-film interference" 2013 Nanotechnology, vol. 24, No. 23 May 15, 2013.

S. Chattopadhyay et al. "Anti-reflecting and photonic nanostructures," Materials Science and Engineering: R: Reports, vol. 69, Issues 1-3, 2010, pp. 1-35, ISSN 0927-796X, https://doi.org/10.1016/j.mser.2010.04.001.

Qiao, DY., Wang, SJ. & Yuan, WZ. A continuous-membrane micro deformable mirror based on anodic bonding of SOI to glass wafer. Microsyst Technol 16, 1765-1769 (2010). https://doi.org/10.1007/s00542-010-1102-0.

J. Wei, S.M.L. Nai, C.K. Wong, L.C. Lee, "Glass-to-glass anodic bonding process and electrostatic force" Thin Solid Films, vols. 462-463, 2004, pp. 487-491, ISSN 0040-6090, https://doi.org/10.1016/j.tsf.2004.05.067. (https://www.sciencedirect.com/science/article/pii/S0040609004006613).

Da-Yong et al., "A Continuous Membrane Micro Deformable Mirror Based on Anodic Bonding of SOI to Glass Water", Microsystem Technologies, Micro and Nanosystems Information Storage and Processing Systems, vol. 16, No. 10, May 20, 2010 pp. 1765-1769.

* cited by examiner

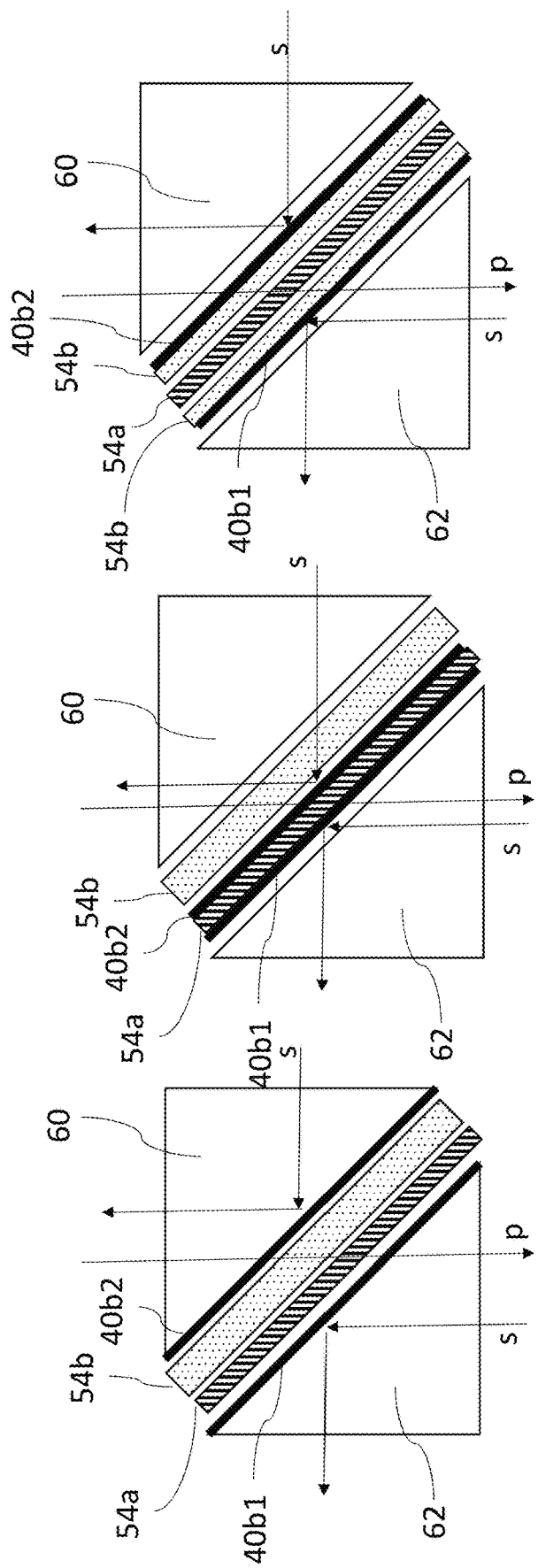

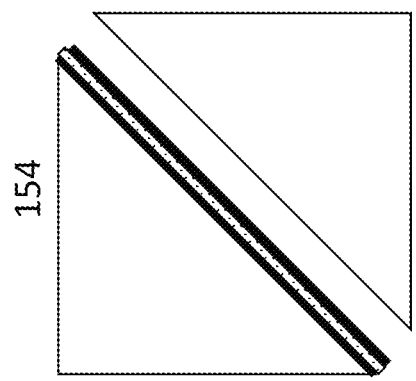
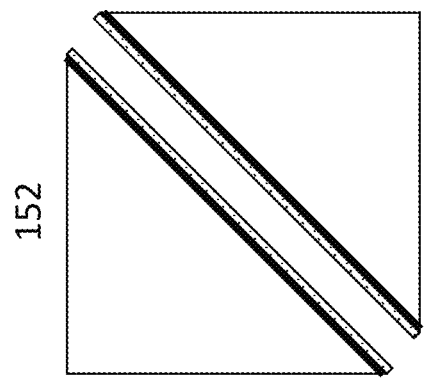
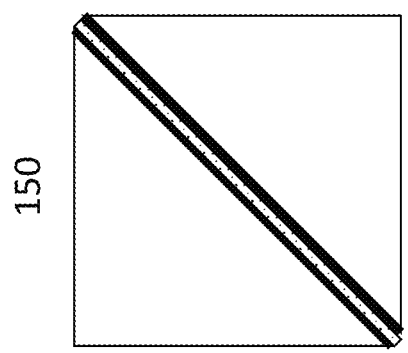
FIG. 10

COMPACT COLLIMATED IMAGE PROJECTOR

TECHNICAL FIELD

The presently disclosed subject matter relates to image projectors, and, more particularly, to compact collimated image projectors.

BACKGROUND

Compact image projectors such as may be used for certain augmented reality displays or other near-eye displays use a spatial light modulator (SLM) such as a Liquid Crystal on Silicon (LCOS) to generate the image to be displayed. In these projectors, various optical elements are arranged in order to i) distribute light from an illumination source across the LCOS at a uniform spatial distribution and at a required angular distribution, and ii) project the light reflected by the LCOS to infinity (collimated) and transmit it to the projector exit pupil. From there, the image may be further transmitted to a combiner for combining the projected image with a view of the real world. Typical combiners are based on a light guide element with a pair of parallel major faces, and a coupling-out arrangement such as a set of parallel inclined partially-reflective surfaces or a diffractive element.

Some of these projectors use an architecture in which a pair of parallel dielectric coated polarizing beam splitters (PBS) serve to both illuminate the LCOS and to collimate the light reflected from the LCOS towards the exit pupil in combination with collimating optics. However unlike structural polarizers, these PBSs suffer from the drawback that the light is separated according to the angle of intersection with the PBS surface. Therefore, any light that is not completely aligned with a PBS, such as off-angle skew rays, can leak through the PBS towards the exit pupil, causing image degradation.

Furthermore, in some cases, such as in short effective focal length (EFL) projectors, it is desirable that only a single optical element is placed along the light path between the SLM and collimating optics.

GENERAL DESCRIPTION

According to one aspect of the presently disclosed subject matter there is provided a collimated image projector that receives light from an illuminating source and propagates the light along a light path towards an exit pupil, the projector including: a first homogeneous dielectric polarizing beam splitter (PBS) deployed along the light path and defining a first transition from a first light path segment to a second light path segment; a second homogeneous dielectric PBS deployed parallel to the first PBS along the second light path segment and defining a second transition from the second light path segment to a third light path segment; and collimating optics deployed along the light path after the second PBS so as to direct a collimated image towards the exit pupil; wherein the first and second PBSs are deployed such that either the first and second transitions are both performed via transmission, or the first and second transitions are both performed via reflection.

According to some aspects the projector can include a spatial light modulator (SLM). The third light path segment can terminate at the SLM.

According to some aspects the projector can include one or more optical elements deployed along the light before the first PBS, including a scanning module deployed along the light path before the first PBS configured to generate an image in an image plane after the second PBS and before the collimating optics. The projector can further include at least one of a diffuser, micro lens array, or reflector deployed along the light path after the second PBS and before the collimating optics.

According to some aspects the first and second PBSs are coated on opposite surfaces of a prism.

According to another aspect of the presently disclosed subject matter there is provided a compound polarizing beam splitter apparatus including: a first single block prism for receiving input light; a second single block prism for transmitting output light, the first and second prism having a first refractive index (RI); and sandwiched between the first and second prisms: a pair of polarizing beam splitter coatings applied to parallel surfaces separated by a structural P polarizer, the polarizer having a second RI different than the first RI, and a first substantially transparent compensating plate having a third RI different than each of the first and second RI and a thickness so as to at least partially compensate for optical aberrations introduced by the polarizer as a result of the difference between the first RI and second RI; wherein a delta between the third RI and second RI is has an opposite sign as compared to a delta between the second RI and the first RI.

According to some aspects the apparatus includes a second compensating plate having the third RI, wherein the first and second plate have a combined thickness so as to at least partially compensate for optical aberrations introduced by the polarizer.

According to some aspects the apparatus includes a third coating parallel to the pair of coatings on an external surface of the first prism where input light is received.

According to some aspects the first compensating plate is between each of the coatings of the pair of dielectric coatings.

According to some aspects at least one of the coatings is adjacent to the second prism.

According to some aspects one of the coatings of the pair of coatings is adjacent to the first prism, and the other coating of the pair of coatings is adjacent to the second prism.

According to some aspects wherein the pair of coatings, polarizer, and first plate are arranged between the first and second prisms so that the P polarization component of the input light follows a transmission path passing sequentially through: the first prism, one of the pair of coatings, the compensating plate, the polarizer, the other one of the pair of coatings, and the second prism.

According to some aspects wherein the pair of coatings, polarizer, and first plate are arranged between the first and second prisms so that the P polarization component of the input light follows a transmission path passing sequentially through: the first prism, the first plate, one of the pair of coatings, the polarizer, the other one of the pair of coatings, and the second prism.

According to some aspects wherein the pair of coatings, polarizer, and first plate are arranged between the first and second prisms so that the P polarization component of the input light follows a transmission path passing sequentially through: the first prism, one of the pair of coatings, the first plate, the polarizer, the second plate, the other one of the pair of coatings, and the second prism.

According to another aspect of the presently disclosed subject matter there is provided a compound polarizing beam splitter apparatus including: a first single block prism for receiving input light, a second single block prism for transmitting output light; and, sandwiched between the first and second prisms, a pair of polarizing beam splitter coatings applied to parallel surfaces separated by a spacer layer comprised of an optically attenuating material having a transmittance of about 40% to about 90%.

According to some aspects the spacer layer is non-polarizing. According to some aspects, the optically attenuating material has a transmittance of about 50% to about 80%.

According to another aspect of the presently disclosed subject matter there is provided a collimated image projector including a compound polarizing beam splitter apparatus including: a first single block prism for receiving input light; a second single block prism for transmitting a P polarization component of the input light, the first and second prism having a first refractive index (RI); and sandwiched between the first and second prisms: a pair of polarizing beam splitter coatings applied to parallel surfaces separated by a structural P polarizer, the polarizer having a second RI different than the first RI, and a first substantially transparent compensating plate having a third RI different than each of the first and second RI and a thickness so as to at least partially compensate for optical aberrations introduced by the polarizer as a result of the difference between the first RI and second RI.

According to another aspect of the presently disclosed subject matter there is provided a collimated image projector including a compound polarizing beam splitter apparatus including: a first single block prism for receiving input light, a second single block prism for transmitting a P polarization component of the input light; and sandwiched between the first and second prisms, a pair of polarizing beam splitter coatings applied to parallel surfaces separated by a spacer layer comprised of an optically attenuating material having a transmittance of about 40% to about 90%.

BRIEF DESCRIPTION OF THE DRAWINGS

In order to understand the invention and to see how it can be carried out in practice, embodiments will be described, by way of non-limiting examples, with reference to the accompanying drawings, in which:

FIGS. 6A-6C illustrate various embodiments of a compound PBS apparatus;

FIG. 10 illustrates various alternative coating method examples for the compound PBS apparatus;

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, and components have not been described in detail so as not to obscure the presently disclosed subject matter.

Throughout this description, unless otherwise noted, the terms "collimating optics" and "collimating lens" are used interchangeably, and refer to a reflecting lens or lens system that collimates the received light, and which is assumed to include a lamda-over-four wave plate (quarter wave plate) for polarization rotation. In addition, the illumination lens is also assumed to include a quarter wave plate.

Figure 1B:
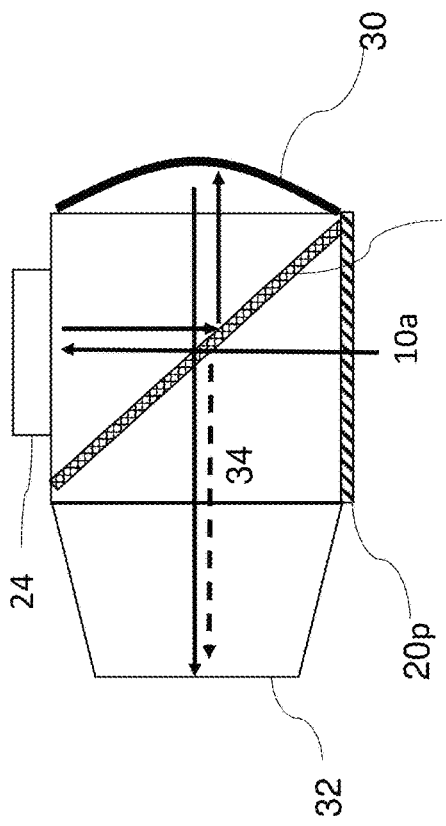
FIGS. 1A-1C illustrate schematic drawings of various embodiments of a collimated image projectors of the prior art.
Figure 1C:
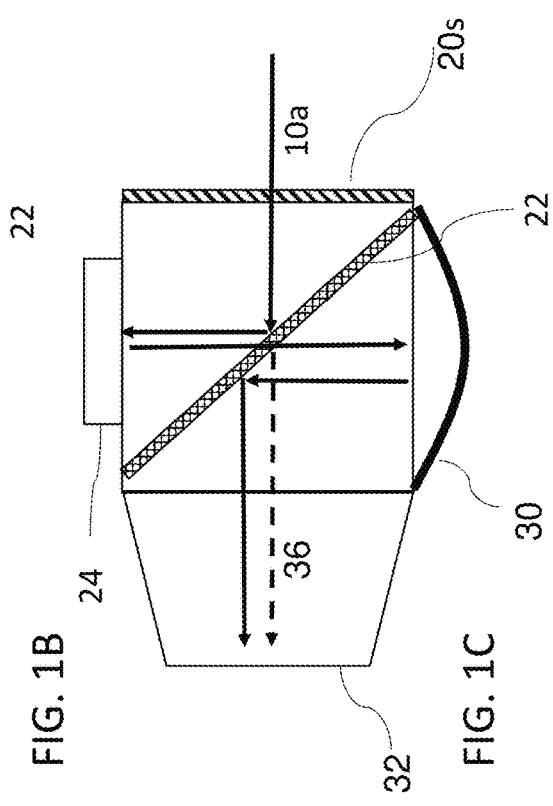
Figure 1A:
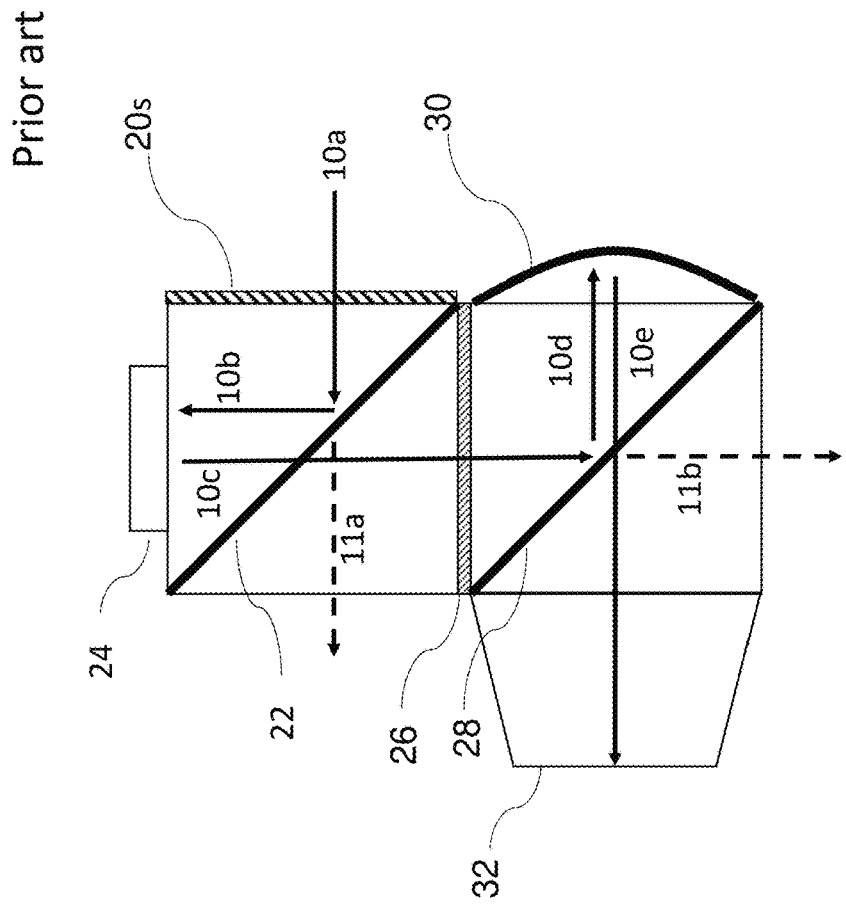

FIG. 1A illustrates a compact collimated image projector of the prior art. In this system, two separate PBSs are used: one PBS illuminates a spatial light modulator (SLM) 24 (e.g. LCOS, etc.) while a second PBS collimates the image. Light 10a from an illumination source (not shown) is filtered by polarizer 20s to be s-polarized. PBS 22 reflects the s-polarized light 10b onto SLM 24. After polarization modulation (modulated by pixel according to the image information so that bright pixels are shifted to P polarization), the reflected light 10c corresponding to the image information with P polarization passes through PBS 22 onto wave plate 26 that converts the P polarization to S polarization. PBS 28 then reflects the light 10d onto a collimating lens 30 that reflects collimated light 10e as P polarization. Light 10e is then transmitted through PBS 28 toward the exit pupil 32. PBSs 22 and 28 have some light leakage 11a, 11b due to off-angle skew rays, as explained below. However this leakage exits the system without entering the exit pupil 32 and therefore do not degrade image contrast or generate ghost images.

By contrast, FIG. 1B illustrates a short effective focal length (EFL) prior art configuration having a single PBS between SLM 24 and lens 30 in which light leakage does in fact degrade image quality. Referring now to FIG. 1B, light 10a from an illuminating source is filtered by polarizer 20p to be p-polarized so as to pass through PBS 22 and impinge on SLM 24 where it is S modulated. The light is then reflected by PBS 22 towards lens 30, where it is collimated, converted to P polarization, and directed towards exit pupil 32. This configuration suffers from shortcomings in that light leakage 34 that is reflected from 10*a* also exits the exit pupil 32 and therefore reduces image contrast. This problem can be partially addressed by use of a high contrast PBS layer, but doing so introduces more light loss and possibly image distortions.

FIG. 1C shows a possible variant of FIG. 1B in which structural polarizer 20*s* passes S polarization towards PBS 22 where it is reflected onto SLM 24 and modulated for P polarization. The light is then passed through PBS 22 to collimating lens 30 and reflected off of PBS 22 towards the exit pupil. However, this configuration also suffers light leakage 36 caused by direct transmission of incident light 10*a* that reaches the exit pupil, and results in degraded image quality.

PBSs 22, 28 are typically homogeneous prism-based dielectric coating polarizers that reflect S polarization and transmit P polarization. This type of PBS reflects the S polarization according to the light orientation relative to the PBSs' vertex. In other words, in contrast to a structural or "Cartesian" polarizer, the dielectric coating of the PBS separates components of polarization according to the local angle of intersection with the surface. Consequently, the polarization of skew rays (i.e. angled relative to the optical axis, and particularly with a significant component directed into the page in FIG. 1A) traversing polarizer 20*s* have a polarization orientation that does not completely align with the polarization of the homogeneous PBSs 22, 28. This lack of alignment results in the light leakage 11*a*, 11*b*. Birefringent coated polarizers and wire-grid polarizers have better overlap with polarizer 20*s* and therefore better extinction ratio (i.e. separation of S and P polarizations). Unfortunately, these polarizers are more expensive, attenuate the light, and introduce distortions to a reflected image.

In contrast to FIG. 1A, where two PBSs are positioned along the light path between SLM 24 and collimating lens 30, in some cases it is advantageous or in fact required to position only a single physical PBS element between SLM 24 and lens 30, similar to FIGS. 1B-1C. However, as discussed above, the prior art configurations result in degraded image quality due to leakage of skew rays or incident light.

According to a first aspect of the presently disclosed subject matter, there is disclosed a short effective focal length (EFL) compact collimated projector with a single homogeneous dielectric homogeneous PBS along a light path between the SLM and collimating optics, and a prior identical homogeneous dielectric PBS functioning as an entrance pre-polarizer, thereby eliminating light-leakage from skew rays onto the exit pupil. The compact collimated projector most preferably uses an air-gap free architecture. By "homogeneous" it is meant that the optical property is the same in all orientations. In other words, the "S" and "P" are defined by the incident ray direction rather than properties of the PBS (and has no polarizing effect on a perpendicular incident ray). The PBSs shown below in FIGS. 2A-4 should be understood to be homogeneous dielectric PBSs. In some particular preferred embodiments, such as in air gap free architectures, the first and second PBSs can be coated on parallel surfaces of the same prism (e.g. a single block prism).

It should be noted that in many of the drawings presented herein, an arrow depicting the light path is depicted by an arrow representing the center beam. Other beams are omitted for visual clarity. The term "light path" includes a folded light path. A "light path segment" refers to a part of the light path that is not folded by other optical elements, and may include the entirety of the non-folded part or a subsection thereof.

Figure 2B:
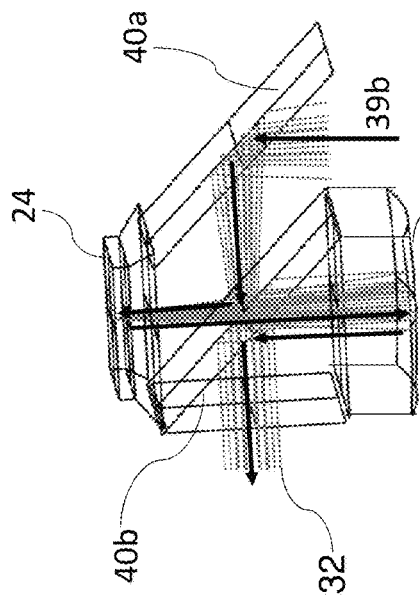
FIG. 2B illustrates a ray tracing diagram corresponding to the embodiment shown in FIG. 2A.
Figure 2C:
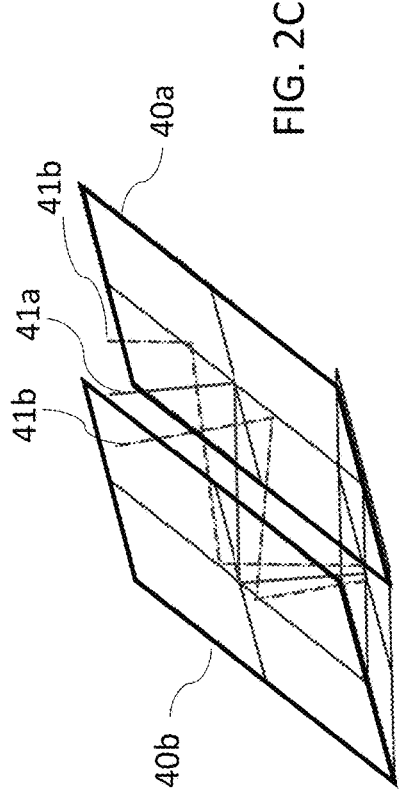
FIG. 2C illustrates rays reflecting between the PBSs shown in FIG. 2A.
Figure 2A:
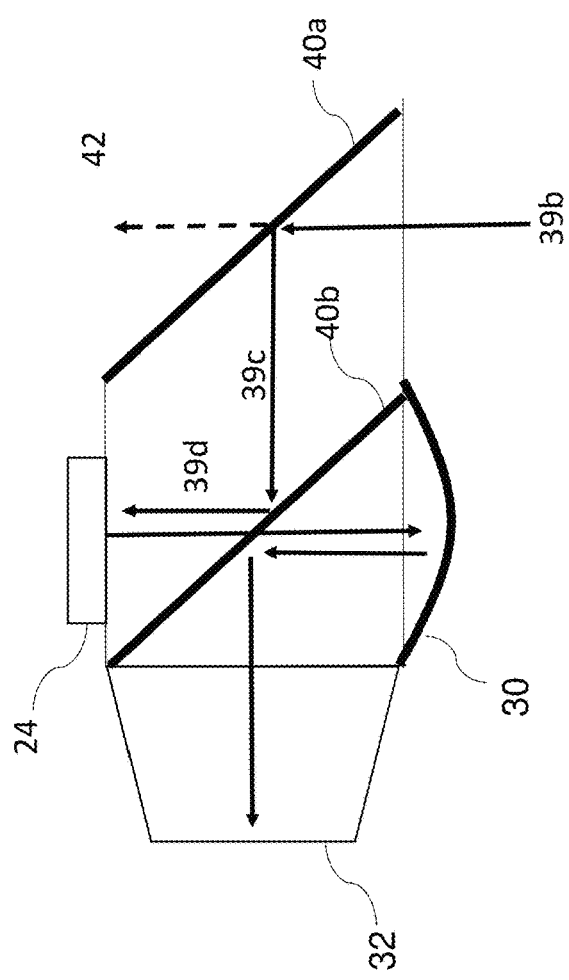
FIG. 2A illustrates a schematic diagram of a collimated image projector according to an embodiment of the presently disclosed subject matter.

FIG. 2A illustrates schematically an embodiment of a compact collimated projector. The projector receives light 39*b* from an illuminating source (not shown) and propagates the light along a light path towards an exit pupil 32. The projector includes a spatial light modulator (SLM) 24 (e.g. an LCOS, etc.), collimating optics 30 and two parallel dielectric coating polarizing beam splitters (PBS) 40*a*, 40*b* that transmit P polarization and reflect S polarization. PBS 40*a* acts as an entrance pre-polarizer for elimination of skew rays. PBS 40*a* is deployed along a first light path segment (shown in FIG. 2A as light 39*b*) and defines a first transition from the first light path segment to a second light path segment (shown in FIG. 2A as light 39*c*). PBS 40*b* is deployed along the light path after the first PBS and defines a second transition from the second light path segment to a third light path segment which in this case terminates at the SLM (shown in FIG. 2A as light 39*d*). PBSs 40*a*, 40*b*, are deployed such that either the first and second transitions are both performed via transmission, or the first and second transitions are both performed via reflection. Preferably, no other optical element should be deployed between PBSs 40*a*, 40*b*. In the third light path segment, light 39*d* reflects off of PBS 40*b* and illuminates SLM 24. Collimating optics 30 is deployed to collimate light from the SLM so as to direct a collimated image towards the exit pupil 32.

As shown in FIG. 2A, incident light 39*b* from an illuminating source (not shown) impinges on PBS 40*a*. Rays 39*c* are directed toward another identical and parallel PBS 40*b* via reflection, while transmitted rays 42 (referred to herein as "leakage") exit the system without entering the exit pupil 32 and consequently have little or no impact on the quality of the projected image. The reflected light 39*c* (including skew rays) has now been pre-filtered by PBS 40*a* such that the light is completely aligned with PBS 40*b*. Light ray 39*c* impinges on PBS 40*b* and is reflected toward SLM 24. The light is modulated by the SLM and then transmitted through PBS 40*b* towards collimating optics 30, where it is collimated and reflected back to PBS 40*b* for reflection towards the exit pupil 32. Contrary to the prior art configurations, the polarization of the skew rays in 39*b* that was filtered by PBS 40*a* is now optimal (i.e. in optical alignment) for PBS 40*b* and therefore no leakage occurs through PBS 40*b* onto exit pupil 32. In other words, for any particular angle of skew rays, only the alignment of polarization that is reflected for that particular ray direction at PBS 40*a* will reach PBS 40*b*, and that polarization is necessarily also the polarization that is reflected at PBS 40*b*. To optimize this effect, PBSs 40*a*, 40*b* preferably are prism-based PBSs which are coated internally on an oblique plane to the plane of incidence with a homogeneous dielectric coating, and are oriented within the projector such that the planes of coating in the two PBSs are parallel. Furthermore, there is preferably no optical perturbation between the two PBSs such as glue, wave plates, etc.

FIG. 2B illustrates a ray tracing diagram illustrating the rays associated with a single point in the image field for the projector embodiment shown in FIG. 2A. FIG. 2C illustrates a further ray tracing diagram showing rays 39*b* (represented here as 41*a* and 41*b*) as they reflect between PBSs 40*a*, 40*b*. The chief ray 41*a* (solid line) is reflected within the optical axis. As such, the linear orthogonal polarization generated after reflection by PBS 40*a* coincides with the polarization of PBS 40*b*. The skew rays 41*b* reflect at different angles and are not necessarily orthogonal to the PBS axis. However, since the PBSs 40*a*, 40*b* are parallel, the relative angle between rays 41*b* and PBS 40*a* is equal to the angle between ray 41*b* and PBS 40*b*. Consequently, leakage occurs at reflection from PBS 40*a*, and when rays 41*b* impinge on PBS 40*b* their polarization is optimal for reflection from 40*b*, so substantially reduced leakage occurs at PBS 40*b*.

It should be noted that embodiments of the disclosed projector may comprise one or more optical elements deployed along the light path after the second PBS and before the collimating optics and/or one or more optical elements deployed along the light path before the first PBS. In addition, projector embodiments are possible without the use of a SLM. For example, in some embodiments, the projector can include a scanning module (e.g. a laser scanner) deployed along the light path before the first PBS configured to generate an image in an image plane after the second PBS and before the collimating optics. In this embodiment, as opposed to a SLM after the second PBS, the projector may include a micro lens array, diffuser or reflector. Micro lens array FIG. 3A illustrates schematically another embodiment of a compact collimated projector. In this embodiment, illumination is further manipulated by an illumination lens 46 to achieve improved illumination efficiency. The light 39A from an illuminating source (not shown) is filtered by a linear structural polarizer 20*p* to have P polarization. The p-polarized light is transmitted through PBS 40*a* onto lens 46 that images the exit pupil 32 onto entrance pupil (in this example 20*p*). In other words, in a particularly preferred embodiment, the exit pupil and entrance are conjugate focal planes. Lens 46 can be used, e.g., for scanning or for efficient illumination. After the reflection from lens 46 the light propagates as S polarization and reflects first off of PBS 40*a* for pre-filtering of skew rays and then off of PBS 40*b* towards SLM 24. In this embodiment, light leakage through PBS 40*a* (dashed arrows) caused by skew rays is not directed away from exit pupil 32 and, due to pre-filtering of skew rays at PBS 40*a*, no leakage occurs at PBS 40*b*. In this embodiment, both the first transition (39*b* to 39*c*) and second transition (39*c* to 39*d*) are performed respectively by PBSs 40*a*, 40*b* by reflection.

Figure 3B:
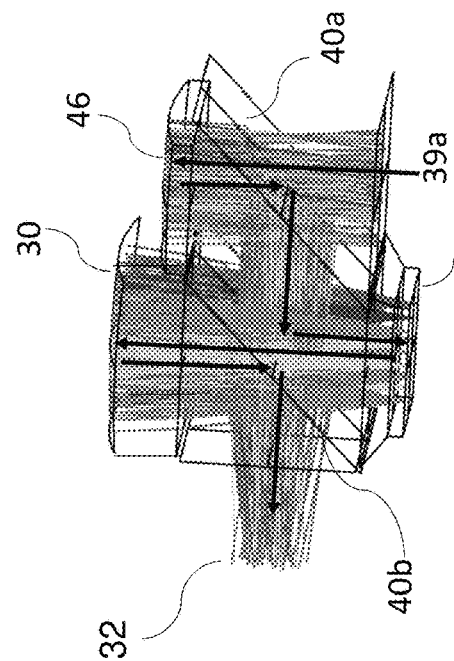
FIG. 3B illustrates a ray tracing diagram corresponding to the embodiment shown in FIG. 3A.
Figure 3A:
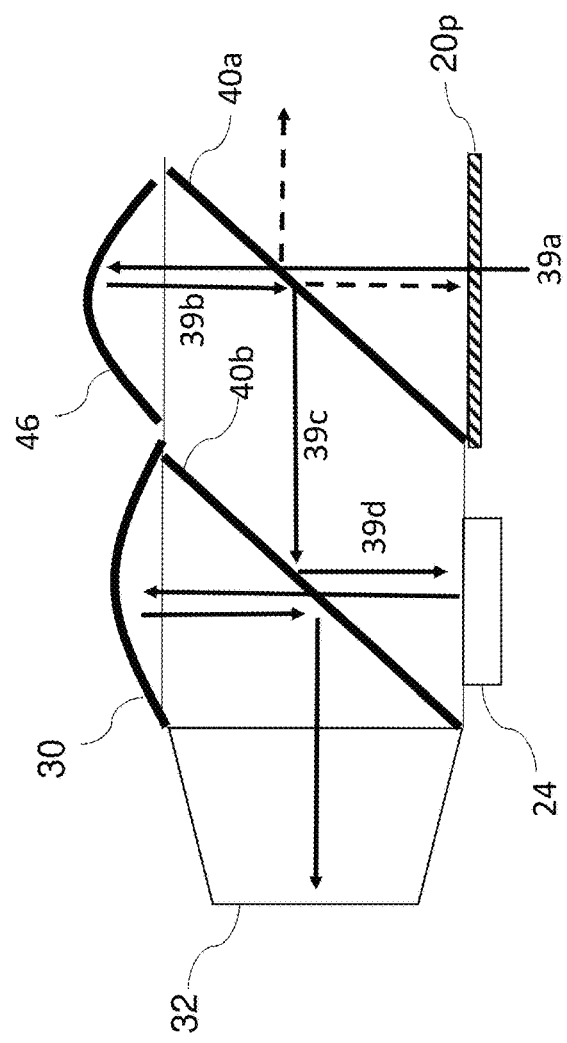
FIG. 3A illustrates a schematic diagram of a collimated image projector according to another embodiment of the presently disclosed subject matter.
Figure 3C:
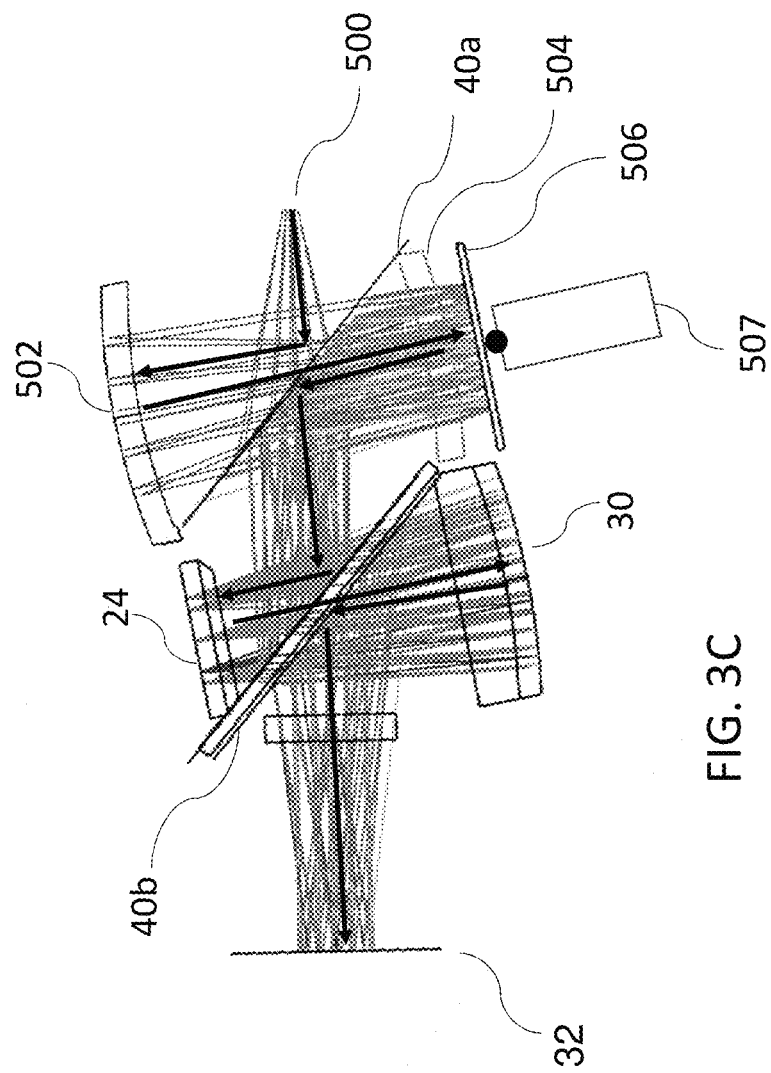
FIG. 3C illustrates a ray tracing diagram corresponding to another embodiment of the projector shown in FIG. 3A.

FIG. 3B illustrates a ray tracing diagram for the projector arrangement shown in FIG. 3A. FIG. 3C illustrates a further ray tracing diagram of a variant configuration. This configuration uses a scanning module 507 (e.g a laser scanner, etc.) that scans the illumination pattern generated by illumination source 500 onto SLM 24. In this configuration, an extra lens 504 is used to collimate the light from the light source. The light source 500, which can be, e.g., a laser, LED or LED array, is s-polarized and illuminates PBS 40*a*. PBS 40*a* diverts the light to collimating reflecting lens 502. The reflected light is changed to P polarization and therefore passes back through PBS 40*a* to be further focused by the curved surface of lens 504 and impinge on a reflector 506. This reflector is located at the image plane of exit pupil 32. In this case, the gap between lens 504 and reflector 506 is the only air gap in the system. The light reflected from reflector 506 then traverses the same light path as described above in FIG. 2A, namely onto the SLM 24, then lens 30 and then to exit pupil 32.

Figure 4:
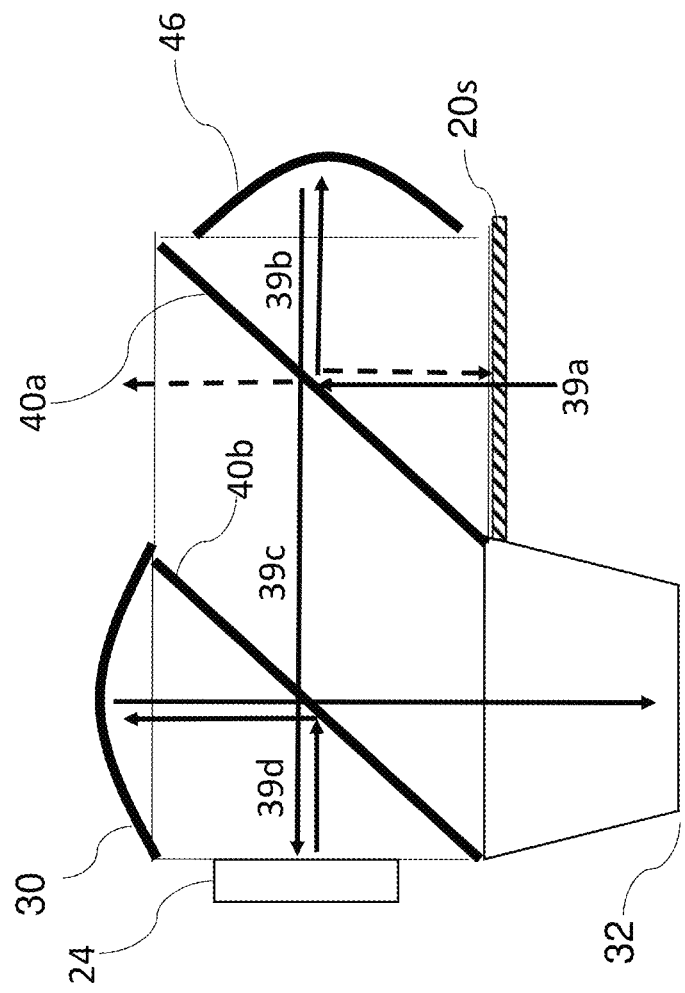
FIG. 4 illustrates a schematic diagram of a collimated image projector according to another embodiment of the presently disclosed subject matter.

FIG. 4 illustrates schematically another embodiment of a compact collimated projector. In this case, the two parallel PBSs 40*a*, 40*b* are deployed such that both the first transition (39*b* to 39*c*) and second transition (39*c* to 39*d*) are performed by transmission instead of reflection. The light 39*a* from an illumination source (not shown) is passed through a structural polarizer 20*s* and exits polarizer 20*s* as s-polarized light. The light is reflected by PBS 40*a* onto lens 46 and reflected back as P polarization through PBS 40*a* and PBS 40*b* onto SLM 24. The reflected bright pixels (rotated to S polarization) are reflected by PBS 40*b* onto collimating optics 30 and on to exit pupil 32. In this embodiment, and contrary to prior art configurations, the optical elements are oriented within the system such that projector's short EFL is maintained (due to proximity of SLM and collimating optics) while light leakage due to skew rays (shown as dashed arrows) are directed away from exit pupil 32.

Compound Polarizing Beam Splitter Apparatuses

While projector embodiments described above are shown to utilize two parallel PBSs, preferably with no other optical element therebetween, in some cases the projector may utilize a compound beam splitter apparatus consisting of two PBS coating planes separated by one or more other layers. Embodiments described below include a P polarizing layer with a compensator layer, and an attenuating layer. In the examples that follow, the PBSs referred to are assumed to be preferably homogeneous dielectric coated PBSs as in the above examples, but are not limited to such, and in fact in other embodiments these PBSs alternatively can be inhomogeneous dielectric (such as that manufactured by 3M) or even wire-grid polarizers.

Compound PBS Apparatus with Compensator Layer

Realistically, the finite efficiency of dielectric beam splitter coatings can result in transmission of some of the S polarization onto the exit pupil and cause a reduction in image contrast. This S transmitted leakage can vary between 1% to 20% depending on the angle and coating properties of the PBS. Combining a structural polarizer and compensator layer can reduce or eliminate S polarization leakage.

Therefore, according to another aspect of the presently disclosed subject matter there is disclosed various embodiments of a compound PBS apparatus that includes two single block prisms, for receiving input light (polarized or unpolarized) and transmitting output light, respectively. Between parallel flat surfaces of the single block prisms are sandwiched (and bonded) a plurality of parallel planes of material including a pair of parallel of PBSs separated by a (structural) P polarizing layer, and a substantially transparent plate acting as a compensator layer. The compensator layer is made of a material and a thickness so as to at least partially compensate for optical aberrations introduced by the polarizer as a result of the difference in refractive index (RI) between the prisms and the polarizer.

In the description above and following, a coating on a surface of the first and/or second prism such that after the prisms are bonded the plane of coating is between the first and second prism is considered "sandwiched" between the prisms. Additionally, "substantially transparent" includes partially absorbing with at least 80% transmittance. A "structural polarizer" includes any polarization element that has a structure which inherently defines a polarization orientation of the transmitted polarized light. It is assumed that the structural polarizer referred to herein has parallel surfaces and is also thicker (wider) than the PBS coatings.

In the following description, the terms "compensator plate" and "transparent plate" are used interchangeably. In addition, the term "coating" should be understood to a multi-layer coating, in which any given layer may be the same or a different than any other layer.

Figure 5B:
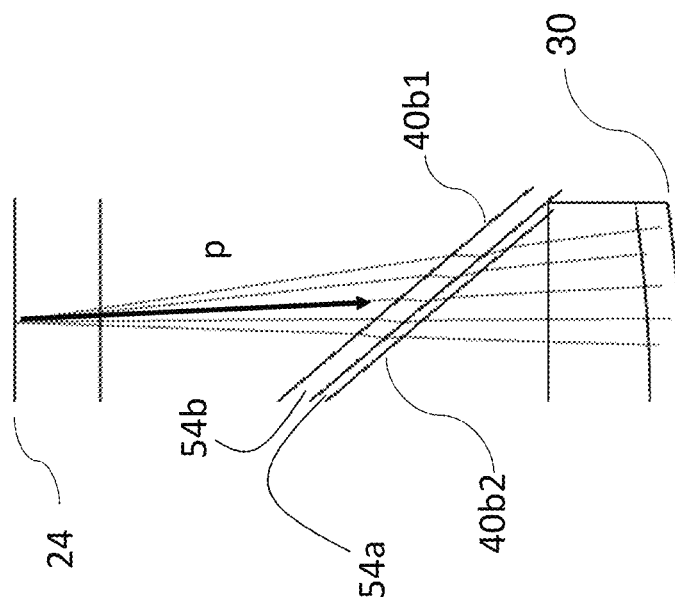
FIG. 5B illustrates an exemplary P polarization ray path through a compound PBS apparatus.
Figure 5A:
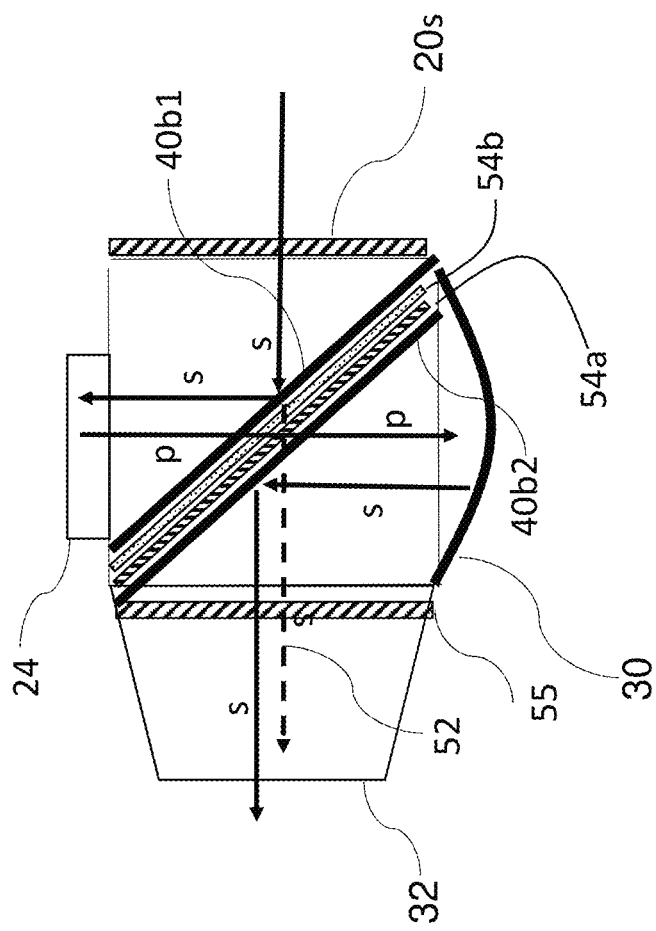
FIG. 5A illustrates a schematic diagram of a collimated image projector according to another embodiment of the presently disclosed subject matter.

Before describing the apparatus itself, the purpose of the apparatus will be now be explained with reference to FIG. 5A illustrating a schematic diagram of an embodiment of a compact collimated projector according to the second aspect. The projector arrangement shown in FIG. 5A is similar to that shown in FIG. 1C, except that a compound beam splitter apparatus is substituted in place of PBS 22. The compound PBS includes two parallel PBS coatings 40b1, 40b2 separated by a structural P polarizer 54a and a substantially transparent intermediate layer (plate) acting as a compensator plate. In this case, unlike the configuration shown in FIG. 1C, in which PBS 22 is assumed to have limited efficiency and therefore some S polarization is leaked (shown as rays 36 in FIG. 1C), in this configuration the light leakage 52 is substantially suppressed by using a compound PBS with two dielectric coating layers 40b1, 40b2 and a P polarizer 54a between the dielectric coatings 40b1, 40b2. Polarizer 54a is preferably a structural polarizer, i.e., in which the axis of polarized transmission is defined by structural features of the material. Examples of suitable structural polarizers include, but are not limited to, an absorbent polarizing filter and a wire grid polarizer. Consequently, the leakage of S polarization 52 is absorbed by 54a prior to reaching exit pupil 32. As further illustrated in FIG. 5A, this aspect can optionally include a structural polarizer 55 that transmits S polarization and is deployed along the light path after dielectric coating layer 40b2 and before exit pupil 32 to further suppress any residual P polarization leakage.

In FIG. 5A, light reflected by the SLM 24 has P polarization and therefore pass through dielectric coating layer 40b1, polarizer 54a and dielectric coating layer 40b2. However, compensator plate 54b is also needed in order to suppress optical distortions (i.e. aberrations) that may be otherwise introduced due to the differential refractive indexes of the polarizer 54a and prism material because of the thickness of polarizer 54a. In FIG. 5A, the compensator plate 54b is shown between the two dielectric coating layers 40b1, 40b2 however this is non-limiting as will be described below with reference to FIGS. 6A-6C. The compensator plate 54b may be made of any suitable transparent material (e.g. plastic, glass, etc.) having a refractive index different from that of the prism material and polarizer. The delta (i.e. signed difference) between the refractive index of the compensator plate and that of the prism should be of an opposite sign as compared to the delta between the refractive index of the polarizer and that of the. For example, if the prisms' glass has refractive index of 1.6 and the polarizer 54a has a refractive index of 1.5 (for a delta of −1), then the transparent plate 54b should most preferably have a refractive index of 1.7 (delta=+1). It should be noted however, that the quantity of the delta does not have to be equivalent in all cases. Different refractive indexes of the plate are possible and the thickness of the plate should be optimized accordingly.

This aspect of the disclosed subject matter may be used advantageously alone, without prior pre-filtering of skew rays as in the configurations shown in FIGS. 2A-4, or may be used in combination therewith, as will be described below with reference to FIG. 7.

FIG. 5B illustrates a ray tracing diagram of the configuration shown in FIG. 5A. Light is reflected from the SLM onto collimating optics 30. As it the light passes through transparent plate 54b, it refracts to one direction and as it passes polarizer 54a it refracts to the opposite direction in such that the rays propagate along the same original line. It should be noted that the dielectric coating layers 40b1, 40b2 are most preferably adjacent to plate 54b and polarizer 54a.

Referring now to FIGS. 6A-6C, various embodiments of a compound PBS apparatus are shown. In each of FIGS. 6A-6C, the components are shown separated for clarity, although it should be appreciated by those skilled in the art that the various components are bonded together using optical adhesives during manufacture. In the variant shown in FIG. 6A, dielectric coating layers 40b1, 40b2 are applied to the internal surfaces of a cube substrate formed by bonding two triangular single block prisms 60, 62, where prism 60 receives the input light and prism 62 transmits a P polarization component of the input light (if such exists). Such an implementation is feasible, but requires high quality finishing of the prism surfaces to prepare them for application of the dielectric coating, and is therefore relatively expensive. FIG. 6B illustrates an alternative configuration in which the dielectric coatings are applied to the polarizer 54b. The coated polarizer 54b and transparent plate are then sandwiched between the wedge prisms 60, 62. In this case, lower quality prism surfaces can be used, since the interface between the layers is typically filled with optically index-matched adhesive. In the variant shown in FIG. 6C, the transparent plate 54a is divided into two thinner plates 54a1, 54a2, the respective plates 54a1, 54a2 placed on either side of the polarizer 54b and coated with the dielectric coatings 40b1, 40b2. These variant configurations have almost the same optical properties but cost of production will vary according to production methods.

Figure 7:
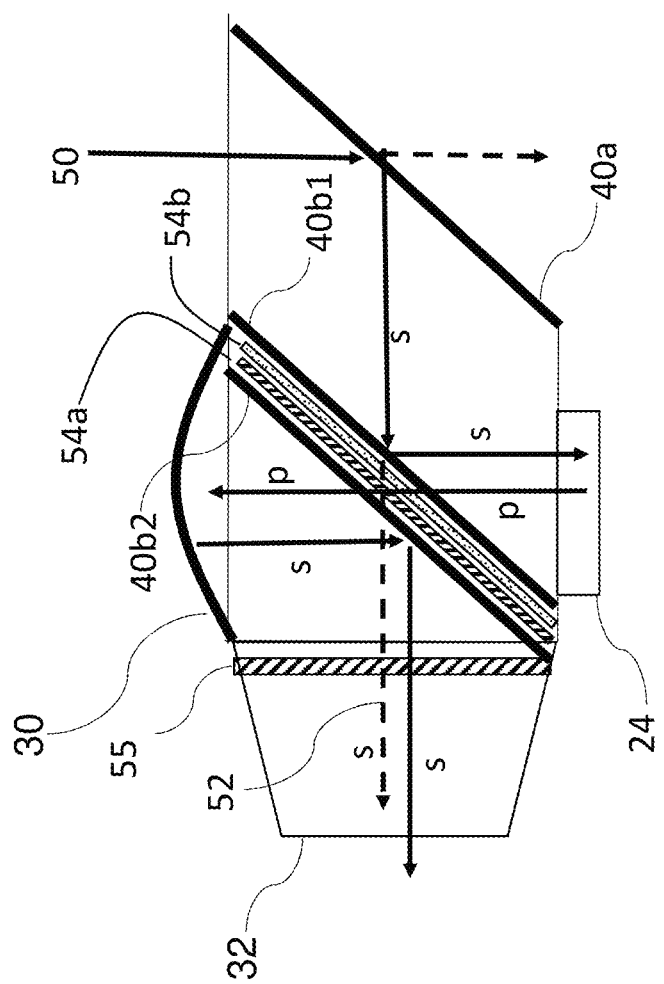
FIG. 7 illustrates a schematic diagram of another embodiment of a collimated image projector utilizing a compound PBS apparatus.

FIG. 7 shows an implementation of the compensating plate 54b in combination with skew rays filtering as shown above in FIG. 2A, illustrating how these two aspects of the invention may advantageously be used in combination.

A further embodiment is possible in which the projector arrangement shown in FIG. 3C is implemented so as to combine the features of these two aspects of the present invention, where the PBS 40b is preferably implemented as one of the structures described with reference to FIGS. 6A-6C.

Compound Polarizing Beam Splitter Apparatus with Attenuating Layer

Another aspect of the presently disclosed subject matter will now be described with reference to FIGS. 8A-10, illustrating various embodiments of a compound polarizing beam splitter apparatus with a spacer layer acting as an attenuating layer. According to this aspect there is disclosed various embodiments of a compound PBS apparatus that includes two single block prisms, for receiving input light (polarized or unpolarized) and transmitting a P polarization component of the input light, respectively. Between flat surfaces of the single block prisms are sandwiched (and bonded) a plurality of parallel planes of material including a pair of parallel of dielectric polarizing beam splitting (PBS) separated by a spacer layer comprised of an optically attenuating material having a transmittance of about 40% to about 90%, and preferably from about 50% to about 80%.

This aspect, which can be used either together with or independently of the features described thus far, provides an alternative approach to suppressing direct illumination by including a partial absorber to suppress resonance.

By way of introduction to this aspect, where an attempt is made to enhance contrast in a PBS by providing a pair of parallel beam splitter layers separated by an intermediate layer, it has been found that the second beam splitter layer makes relatively little contribution to eliminating S polarization leakage through the double beam splitter. This can be at least partly explained by rays that penetrate the first beam splitter layer and undergo multiple internal reflections within the intermediate layer prior to exiting through the second beam splitter layer.

Figure 8B:
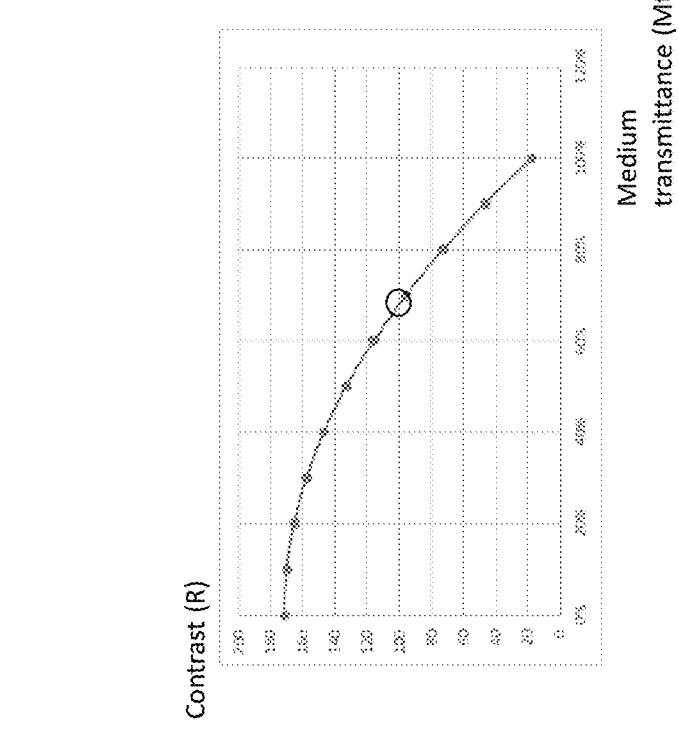
FIG. 8B illustrates a graph showing contrast vs. medium transmittance.
Figure 8A:
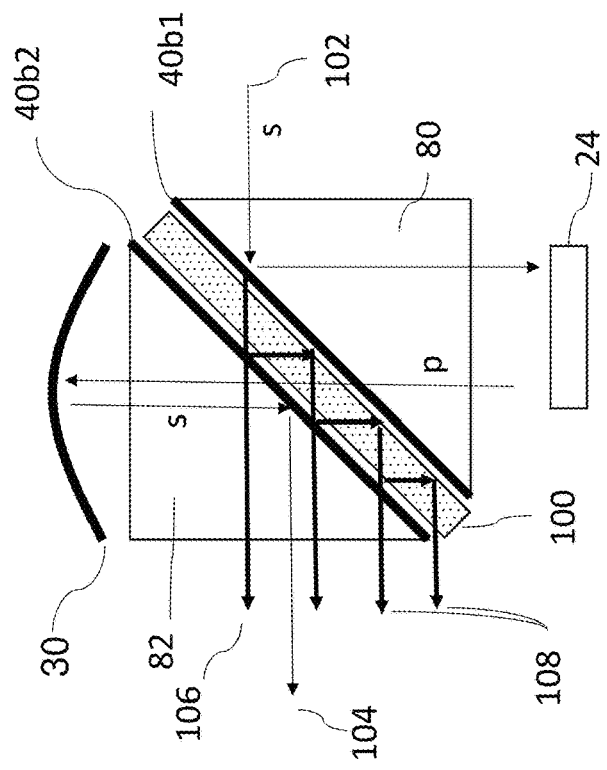
FIG. 8A illustrates a ray diagram showing the effect of multiple internal reflections between PBS coatings.

For example, referring now to FIG. 8A, assume that incident ray 102 having S polarization is transmitted through prism 60. Upon hitting the first PBS coating 40b1, ray 102 is 0.95 (i.e. 95%) reflected and 0.05 (i.e. 5%) transmitted. It would normally be expected that the "straight-through" ray component 106 will be attenuated by a factor of $(0.05)^2$ (i.e. 0.0025). However, in addition to the straight-through ray component 106, other components of ray 102 which penetrate PBS coating 40b1 undergo a series of multiple internal reflections within the intermediate layer 100 and multiple partial exits through the second PBS coating 40b2 leading to a series of secondary "leaked" ray components 108, each with a transmittance of 0.05. It should be noted that the above is provided as a simplified example and purposely ignores the effect of resonance within the intermediate layer, as will be discussed below.

In the above example, the series of secondary leaked ray components would have intensities corresponding roughly to $(0.95)^2 \times (0.05)$, $(0.95)^4 \times (0.05)$, $(0.95)^6 \times (0.05)$ etc., or 0.045, 0.041, 0.037 etc. The sum total of the intensities of leaked ray components results in a relatively high proportion of the light that leaked through the first beam splitter coating 40b1 also passing through the second beam splitter coating 40b2.

The above explanation holds true for beam splitter coating pairs with relatively large spacing between the coating (e.g. a relatively wide intermediate layer), where resonance/interference effects are not relevant. For smaller spacing on the order of a wavelength, interference effects may in some cases result in larger proportions of the S polarization leaking through the double beam splitter than would penetrate a single beam splitter.

Accordingly, it has been found that the components of leakage that derive from multiple internal reflections between the beam splitter coatings can be disproportionately attenuated by including an attenuating layer between the two beam splitters. By careful choice of the degree of attenuation provided by the intermediate spacer layer, it is possible to keep attenuation of the main signal (e.g., image) within acceptable limits while achieving much greater attenuation of the multiply internally-reflected secondary leakage rays, and thereby achieve greatly enhanced output image contrast. This approach is applicable both to non-resonant implementations and to implementations with closely spaced beam splitters, where resonance effects are significant.

Various exemplary embodiments of this aspect will now be described. In FIG. 8A, the incident light 102 which is assumed to be s-polarized (previously described) enters prism 80 and reflects from PBS coating 40b1 having reflectivity Sr1 onto SLM 24 having reflectivity Lr (intensity of P polarization for the maximum image intensity pixels). The light then passes thought PBS coating 40b1 (transmittance Pt1), through spacer layer ("medium") 100 (transmittance Mt), through PBS coating 40b2 (transmittance Pt2) and exit prism 82 into mirror (or other reflective lens) 30 and subsequently reflected by PBS coating 40b2 (reflectance Sr2). Parenthetically, it should be noted that as described above, the presence of a quarter wave plate associated with mirror 30 in order to convert P polarization to S polarization is assumed. For convenience, all optical losses due to the SLM, mirror, quarter wave plate and any other interfaces not related to the compound PBS apparatus are already taken into consideration for the purposes of the SLM reflectivity.

The intensity transmittance of the output ray 104 can be approximated as:

$$T\_out = Sr1 \cdot Lr \cdot Pt1 \cdot Mt \cdot Pt2 \cdot Sr2$$

For simplicity, it is assumed that PBS coating 40b1 is equivalent to PBS coating 40b2 (which also corresponds to a non-limiting but particularly preferred example of this aspect of the disclosed subject matter), and therefore:

$$T\_out = Sr^2 \cdot Lr \cdot Pt^2 \cdot Mt$$

The undesired illumination includes direct transmittance ray 106 and internally guided light (between the PBS coatings 40b1, 40b2) that couples-out as rays 108. The total output illumination of this internal resonance can be approximated as a geometric series. For clarity, in the following, an incoherent summation is assumed (no phase calculation) as is equivalence of PBS coatings 40b1, 40b2. The transmittance of direct illumination after internal resonance (rays 106, 108) is:

$$T\_direct = St^2 \cdot Mt / (1 - Sr^2 \cdot Mt^2)$$

Where St is the transmittance of S polarization through the PBS layer and can be approximated as St=1−Sr. This is the sum of an infinite converging series where edge effects are neglected. The ratio between the image transmittance and direct illumination (contrast) is:

$$R = T\_out / T\_direct = Sr^2 \cdot Lr \cdot Pt^2 \cdot (1 - Sr^2 \cdot Mt^2) / St^2$$

It is apparent that as the transmittance Mt of medium 100 is reduced, the contrast improves:

At maximal resonance (if medium 100 is fully transparent):

$$R(Mt=100\%) = Sr^2 \cdot Lr \cdot Pt^2 \cdot (1 - Sr^2) / St^2$$

At no resonance (if medium 100 has very low transmittance and practically no image transmittance) the contrast converges to:

$$R(Mt \to 0\%) = Sr^2 \cdot Lr \cdot Pt^2 / St^2$$

According to this invention a desired contrast is achieved by setting moderate transmittance of medium 100 that introduces an acceptable level of signal/image attenuation (preferably attenuation of less than 50%) in order to achieve the enhanced S/N ratio (contrast).

FIG. 8B illustrates a graph showing contrast (y-axis) vs. medium 100 transmittance (x-axis). As shown in FIG. 8B, PBS reflectivity Sr=95%, PBS transmittance St=5%, PBS transmittance Pt=95% and system loss (SLM and optics) Lr=50% (values are approximate).

It is apparent that without absorption the contrast is R(Mt=100%)=17 (not acceptable for imaging systems) while at minimal transmittance the contrast is R(Mt→0)=170 (the low image transmittance is also not acceptable). However, at medium transmittance the contrast R(Mt=68%)=100. This is an optimal system having good contrast and acceptable 32% image loss. Depending on the particular design considerations, solutions which have medium transmissivity Mt in the range of 40%-90%, and more preferably 50%-80%, are of particular advantage.

The above description relating to incoherence, while neglecting phase, was made for clarity and is accurate if the thickness of medium 100 is larger than the coherence length of the light. In practice, PBS coating 40b1, followed by medium 100 and PBS coating 40b2 can be generated as a continuous sequence of coatings having minimal gap and thickness. For example, medium 100 can be a thin (e.g., a few nanometers thickness) metallic layer of absorbing Nickel. In such a case, a numerical iterative design method that considers phase should be used while basing on the same principle of more than one PBS coating having an absorber in between.

Figure 9A:
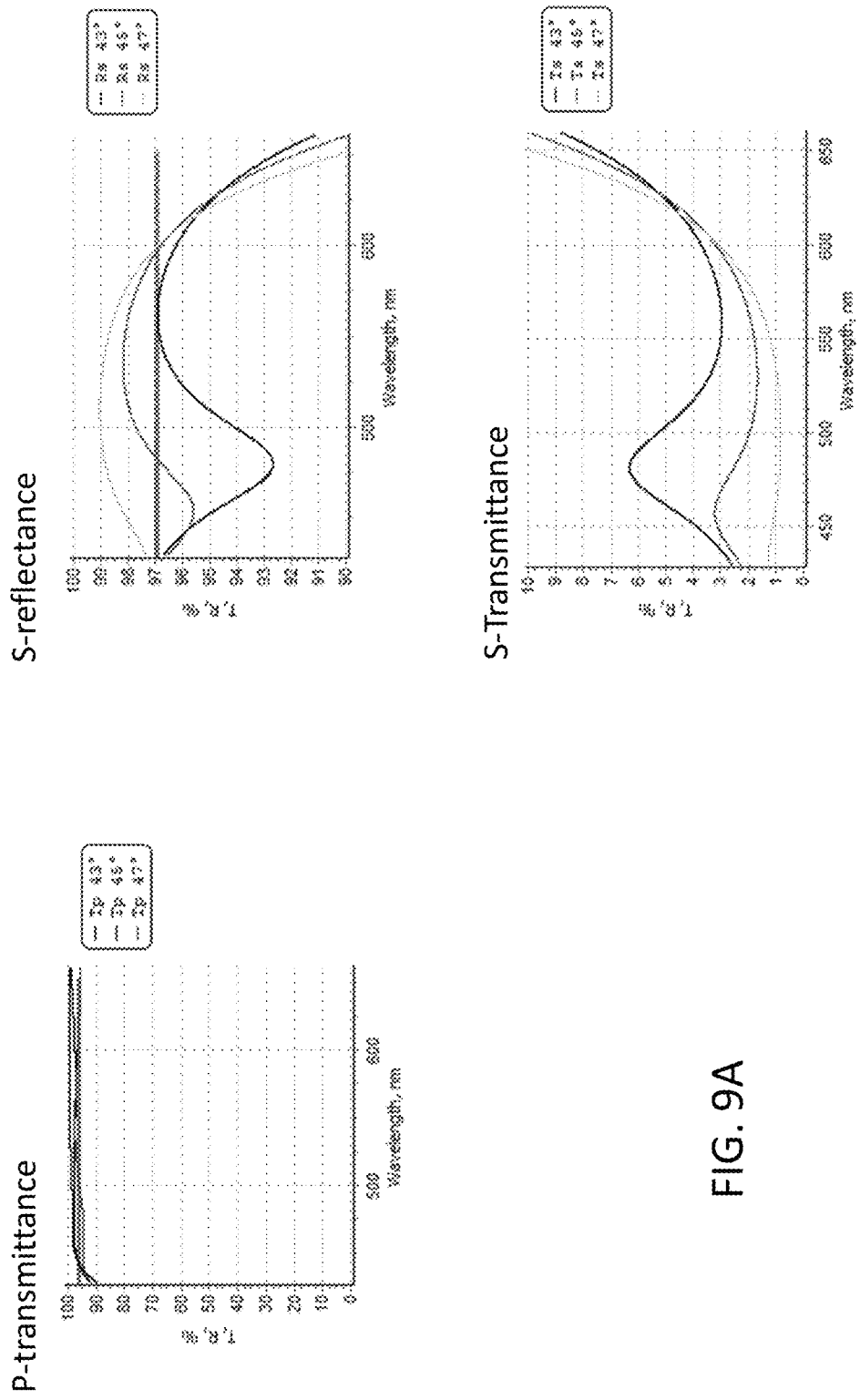
FIG. 9A illustrates a series of graphs showing the spectral performance of a single PBS coating at three incidence angles around nominal.
Figure 9B:
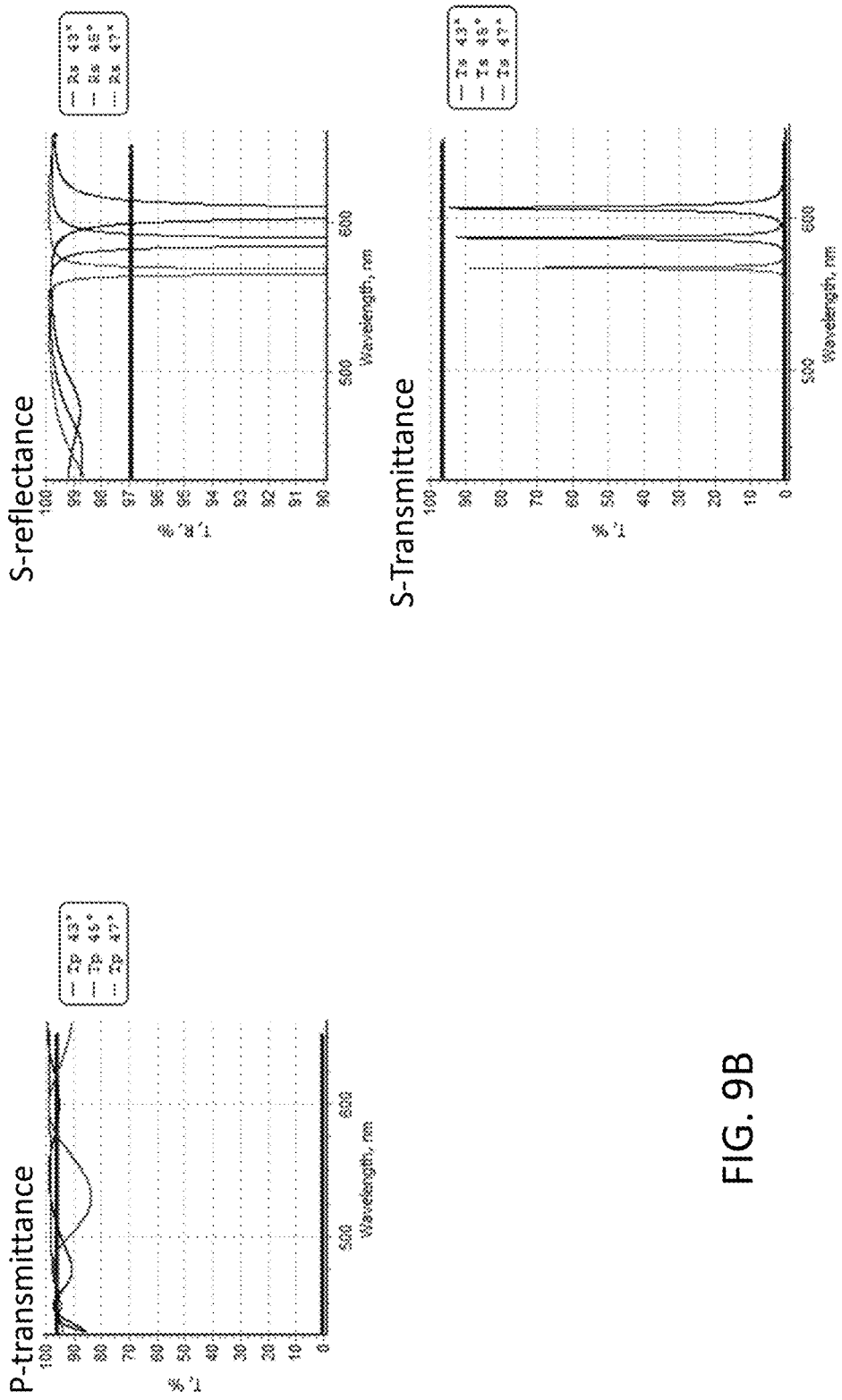
FIG. 9B illustrates a series of graphs showing a reference performance of two PBS coatings in opposite orientations.
Figure 9C:
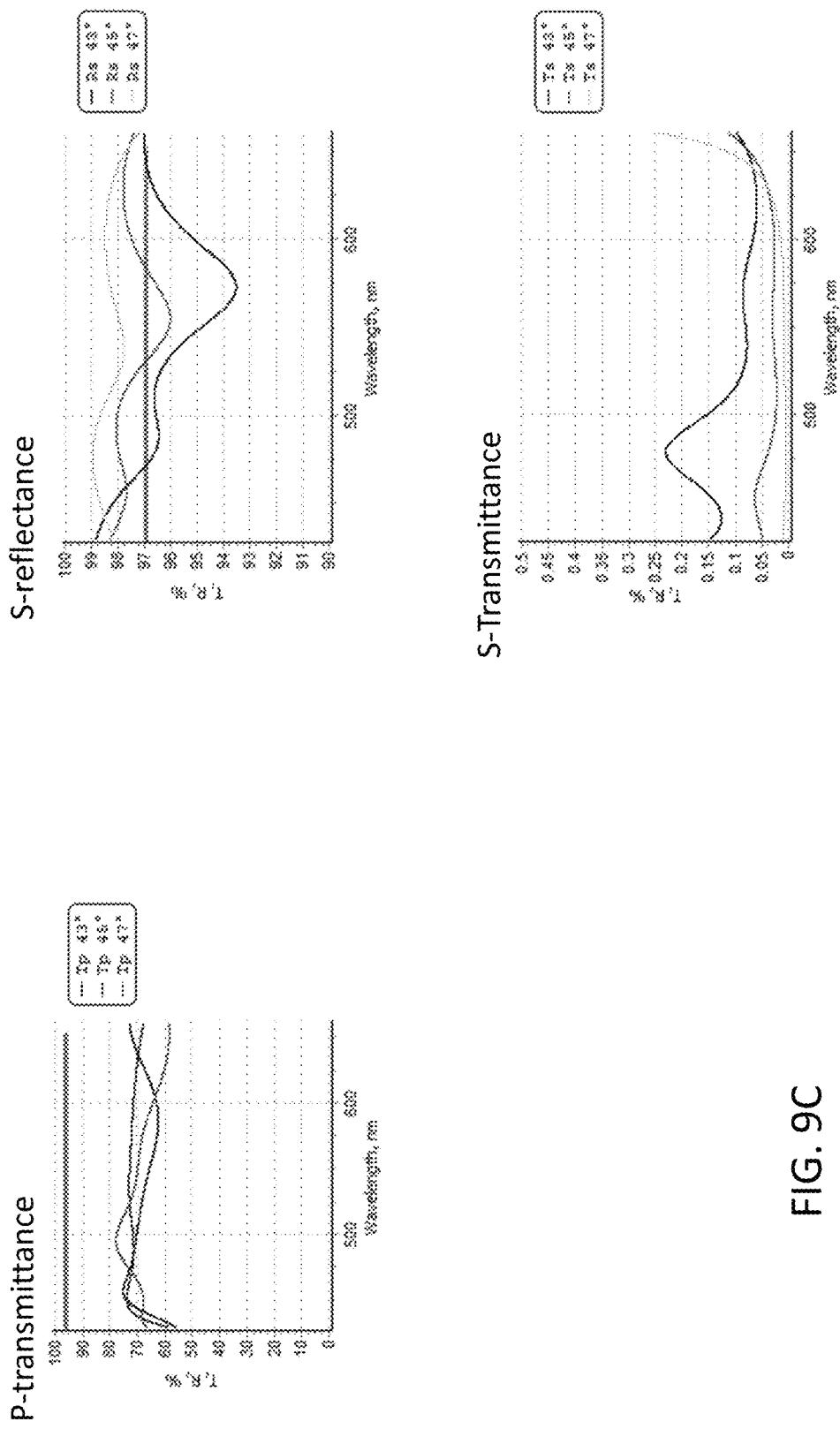
FIG. 9C illustrates a series of graphs showing performance of two PBS coatings with an absorbing spacer layer.

FIGS. 9A-9C illustrate the results of a simulation performed for a compound polarized beam splitter apparatus based a prism material consisting of a glass N-SF57 substrate. The PBS coatings 40b1 and 40b2 are identical and are each made up of twelve (12) layers of a dielectric coating. The absorbing layer (medium) is formed from four coated layers of a suitably absorbing material, such as Nickel, etc. FIG. 9A illustrates a series of graphs showing the spectral performance of a single PBS coating (40b1 or 40b2) at three incidence angles around nominal. It is apparent that the transmittance is between 1 and 6 percent, which is not acceptable for high contrast image requirements. FIG. 9B illustrates a series of graphs showing a reference performance of two PBS coatings (40b1 and 40b2) placed against each other in opposite orientations as illustrated in FIG. 8A, and having a transparent thin layer in between. This coherence case is analogous to a case of 100% transmittance shown in the incoherent case of FIG. 8B. It is apparent that the S-transmittance is strongly oscillating between 0% and 90%. This is clearly also not acceptable for high contrast. FIG. 9C illustrates a series of graphs showing performance of two PBS coatings (40b1 and 40b2) with an absorbing layer (medium) 100. The absorbing layer was calibrated for transmittance of 70% equivalent to the incoherent case shown in FIG. 8B. The average transmittance in this case is around 0.15% that is equivalent to contrast of C_coherent=300. This is much higher than the C_incoherent=100 as can be expected from a coherent system.

It should be noted that the interim absorbing layer separates the two PBS coatings to be practically independent. Consequently, no high accuracy is required between the two PBSs therefore production is more robust to tolerances and inaccuracies.

Preferably, the refractive index of absorbing layer (medium) 100 is close to that of the surrounding prism or coating layers. It should be noted that a large difference in refractive index associated with a large thickness of this layer is likely to cause image distortion as described above with reference to FIG. 5B. However, as described above with reference to FIG. 5B, the distortion effect can be solved using a compensator layer.

Referring now to FIG. 10, various alternative coating method examples for producing the compound PBS apparatus according to this aspect are described. Example 150 shows a coating method where the PBS coatings 40b1, 40b2 are applied to opposite sides of the absorbing layer (medium) 100 and the absorbing layer sandwiched between prisms. Example 152 shows a coating method whereby each prism is coated with a PBS coating and a half-thickness coating of the absorbing layer (medium) 100. The two prisms are then bonded together. Example 154 shows a coating method whereby one of the prisms is coated with a first PBS coating, followed by the absorbing layer coating, followed by the second PBS coating. The two prisms are then bonded together.

It should be noted that prisms 60, 80 can have an external surface (where light enters) that is parallel to the pair of parallel dielectric coatings, and this surface can be coated with a third dielectric coating for pre-filtering of skew rays, thereby combining the features of the various aspects of the invention described above.

Figure 11B:
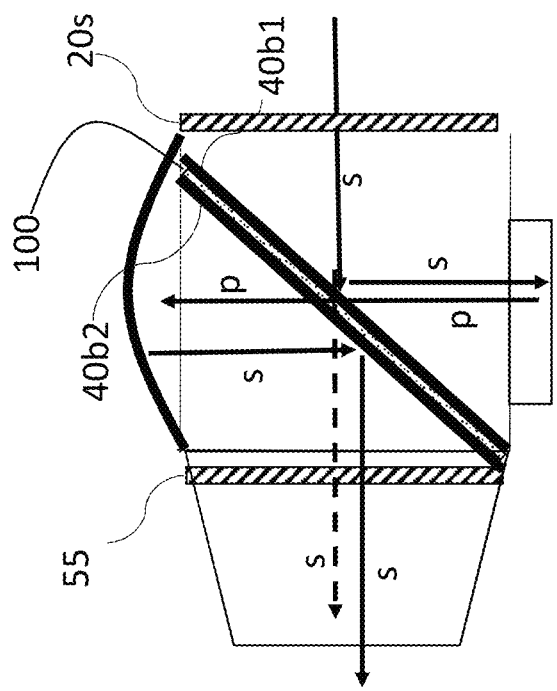
FIG. 11B illustrates a schematic diagram of a collimated image projector according to another embodiment of the presently disclosed subject matter.
Figure 11A:
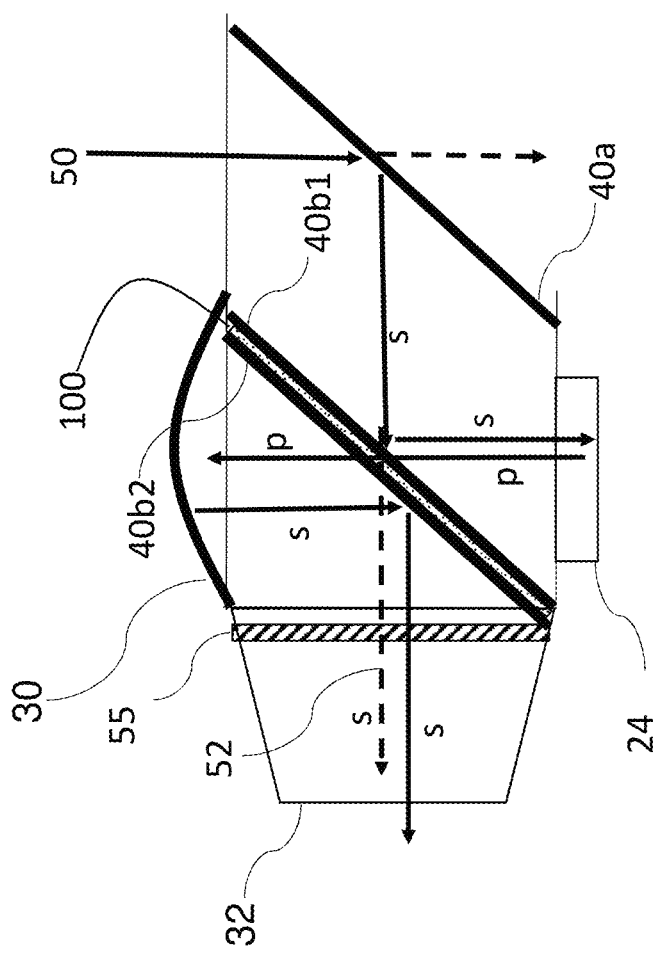
FIG. 11A illustrates an embodiment of a projector which uses a compound PBS with attenuating layer and a second PBS for pre-filtering of skew rays.

FIG. 11A illustrates an embodiment of a projector which uses a combination of the compound PBS with attenuating layer of the third aspect with a second PBS for pre-filtering of skew rays of the first aspect according to the principles described above with reference to FIGS. 2A-4. FIG. 11A provides a similar configuration to FIG. 7 except that the polarizer 54a and compensating plate 54b have been replaced by attenuating layer 100.

In a similar vein, FIG. 11B illustrates an embodiment of a projector that has a configuration similar to that of FIG. 5A except that the polarizer 54a and compensator layer 54b have been replaced by attenuating layer 100.

In the combined embodiments, the entry light prism may have an external surface through which the light enters that is parallel to the pair of parallel dielectric coatings. This surface can be coated with a third dielectric coating, thereby combining the features of the various aspects of the invention described above in a single apparatus.

Although the invention has been described herein in the context of an image projection system particularly suited to near-eye displays, it should be noted that this aspect of the invention is widely applicable to any and all situations where it is desirable to achieve enhanced contrast between a signal of a desired polarization and noise of an undesired polarization passing through a PBS. For example, in FIG. 3C, PBS 40a can also be implemented using a compound PBS with attenuator layer according to this aspect of the present invention.

The invention claimed is:

1. A collimated image projector that receives light from an illuminating source and propagates the light along a light path towards an exit pupil, the projector comprising:
   a first homogeneous dielectric polarizing beam splitter (PBS) deployed along the light path and defining a first transition from a first light path segment to a second light path segment;
   a second homogeneous dielectric PBS deployed parallel to the first PBS along the second light path segment and defining a second transition from the second light path segment to a third light path segment; and
   collimating optics deployed along the light path after the second PBS so as to direct a collimated image towards the exit pupil;
   wherein the first and second PBSs are deployed such that either the first and second transitions are both performed via transmission, or the first and second transitions are both performed via reflection,
the collimated image projector further comprising a scanning module deployed along the light path before the first PBS configured to generate an image in an image plane after the second PBS and before the collimating optics.

2. The projector of claim 1, further comprising a spatial light modulator (SLM) deployed along the light path after the second PBS and before the collimating optics.

3. The projector of claim 2, wherein the third light path segment terminates at the SLM.

4. The projector of claim 1, further comprising one or more optical elements deployed along the light before the first PBS.

5. The projector of claim 1, further comprising at least one of a diffuser, micro lens array, or reflector deployed along the light path after the second PBS and before the collimating optics.

6. The projector of claim 1, wherein the first and second PBSs are coated on opposite surfaces of a prism.

7. A compound polarizing beam splitter apparatus comprising:
   a first single block prism for receiving input light;
   a second single block prism for transmitting output light the first and second prism having a first refractive index (RI); and
   sandwiched between the first and second prisms:
      a pair of polarizing beam splitter (PBS) coatings applied to parallel surfaces separated by a structural P polarizer, the polarizer having a second RI different than the first RI, and
      a first substantially transparent compensating plate having a third RI different than each of the first and second RI and a thickness so as to at least partially compensate for optical aberrations introduced by the polarizer as a result of the difference between the first RI and second RI;
wherein a delta between the third RI and second RI has an opposite sign as compared to a delta between the second RI and the first RI,
the beam splitter apparatus further comprising a third PBS coating parallel to the pair of PBS coatings on an external surface of the first prism where input light is received.

8. The apparatus of claim 7, further comprising a second compensating plate having the third RI, wherein the first and second plate have a combined thickness so as to at least partially compensate for optical aberrations introduced by the polarizer.

9. The apparatus of claim 7, wherein the first compensating plate is between each of the PBS coatings of the pair of PBS coatings.

10. The apparatus of claim 7, wherein at least one of the PBS coatings is adjacent to the second prism.

11. The apparatus of claim 7, wherein one of the pair of PBS coatings is adjacent to the first prism, and the other one of the pair of PBS coatings is adjacent to the second prism.

12. The apparatus of claim 7, wherein the pair of PBS coatings, polarizer, and first plate are arranged between the first and second prisms so that the P polarization component of the input light follows a transmission path passing sequentially through: the first prism, one of the pair of PBS coatings, the compensating plate, the polarizer, the other one of the pair of PBS coatings, and the second prism.

13. The apparatus of claim 7, wherein the pair of PBS coatings, polarizer, and first plate are arranged between the first and second prisms so that the P polarization component of the input light follows a transmission path passing sequentially through: the first prism, the first plate, one of the pair of PBS coatings, the polarizer, the other one of the pair of PBS coatings, and the second prism.

14. The apparatus of claim 8, wherein the pair of PBS coatings, polarizer, and first plate are arranged between the first and second prisms so that the P polarization component of the input light follows a transmission path passing sequentially through: the first prism, one of the pair of PBS coatings, the first plate, the polarizer, the second plate, the other one of the pair of PBS coatings, and the second prism.

15. A collimated projector comprising the compound polarizing beam splitter apparatus of claim 7.

* * * * *